United States Patent
Luo et al.

(10) Patent No.: US 11,307,733 B2
(45) Date of Patent: Apr. 19, 2022

(54) ALWAYS ON DISPLAY METHOD AND ELECTRONIC DEVICE

(71) Applicant: Huawei Technologies Co., Ltd., Shenzhen (CN)

(72) Inventors: Honglei Luo, Shanghai (CN); Chunyan Zhang, Shenzhen (CN); Jie Yin, Shanghai (CN); Zhihui Teng, Shanghai (CN); Jin Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/051,161

(22) PCT Filed: Apr. 22, 2019

(86) PCT No.: PCT/CN2019/083715
§ 371 (c)(1),
(2) Date: Oct. 27, 2020

(87) PCT Pub. No.: WO2019/206091
PCT Pub. Date: Oct. 31, 2019

(65) Prior Publication Data
US 2021/0181923 A1 Jun. 17, 2021

(30) Foreign Application Priority Data
Apr. 28, 2018 (CN) .......................... 201810401666.6

(51) Int. Cl.
*G06F 3/04817* (2022.01)
*G06F 3/04883* (2022.01)
(52) U.S. Cl.
CPC ...... *G06F 3/04817* (2013.01); *G06F 3/04883* (2013.01)

(58) Field of Classification Search
CPC .. G06F 3/0487; G06F 3/0488; G06F 3/04883; G06F 3/04817; H04W 52/0274
See application file for complete search history.

(56) References Cited

U.S. PATENT DOCUMENTS

| 8,588,860 | B2 | 11/2013 | Sirpal et al. |
| 10,847,122 | B2 | 11/2020 | Zhu |

(Continued)

FOREIGN PATENT DOCUMENTS

| CN | 103348311 A | 10/2013 |
| CN | 103473048 A | 12/2013 |

(Continued)

OTHER PUBLICATIONS

Ballein, M., "Apple iOS: So aktiviert ihr den Night Shift-Modus (Blaulichtfilter)," XP055796293., Mar. 21, 2016, 8 pages (with Partial Translation).

*Primary Examiner* — Mong-Shune Chung
(74) *Attorney, Agent, or Firm* — Slater Matsil, LLP

(57) ABSTRACT

An always on display method and an electronic device relate to the field of terminal technologies. The method includes obtaining, by an electronic device having a touchscreen, first device status information, where the first device status information is first information related to a first current running state of the electronic device, determining a first always on display interface based on the first device status information, displaying the first always on display interface on the touchscreen, obtaining second device status information, where the second device status information is second information related to a second current running state of the electronic device, determining a second always on display interface based on the second device status information, and displaying the second always on display interface on the touchscreen.

15 Claims, 24 Drawing Sheets

(56) References Cited

U.S. PATENT DOCUMENTS

| | | | |
|---|---|---|---|
| 10,909,946 | B2 | 2/2021 | Jung |
| 2014/0118272 | A1 | 5/2014 | Gunn |
| 2015/0042572 | A1 | 2/2015 | Lombardi et al. |
| 2016/0044091 | A1 | 2/2016 | Doumet |
| 2016/0062589 | A1 | 3/2016 | Wan et al. |
| 2016/0301990 | A1 | 10/2016 | Tang |
| 2016/0349868 | A1* | 12/2016 | Kim ............... G06F 1/1637 |
| 2017/0160898 | A1* | 6/2017 | Lee ............... G06F 3/041 |
| 2018/0121060 | A1* | 5/2018 | Jeong ............... G06F 9/451 |
| 2018/0279050 | A1* | 9/2018 | Ryu ............... H04R 5/04 |
| 2021/0109623 | A1* | 4/2021 | Bae ............... G06F 3/0416 |

FOREIGN PATENT DOCUMENTS

| | | |
|---|---|---|
| CN | 104392707 A | 3/2015 |
| CN | 104866065 A | 8/2015 |
| CN | 104954558 A | 9/2015 |
| CN | 105723310 A | 6/2016 |
| CN | 106469011 A | 3/2017 |
| CN | 106643695 A | 5/2017 |
| CN | 106708358 A | 5/2017 |
| CN | 106951142 A | 7/2017 |
| CN | 107147928 A | 9/2017 |
| CN | 107491280 A | 12/2017 |
| CN | 107608728 A | 1/2018 |
| CN | 107948437 A | 4/2018 |
| WO | 2018072411 A1 | 4/2018 |

\* cited by examiner

ALWAYS ON DISPLAY METHOD AND ELECTRONIC DEVICE

CROSS REFERENCE TO RELATED APPLICATIONS

This application is a national stage of International Application No. PCT/CN2019/083715, filed on Apr. 22, 2019, which claims priority to Chinese Patent Application No. 201810401666.6, filed on Apr. 28, 2018. Both of the aforementioned applications are hereby incorporated by reference in their entireties.

TECHNICAL FIELD

This application relates to the field of terminal technologies, and in particular, to an always on display method and an electronic device.

BACKGROUND

Always on display means that after a screen of an electronic device (for example, a mobile phone or a tablet computer) is turned off, a part of an area on the screen can be turned on to display information such as a clock, a date, and a notification. This facilitates a user operation and enhances user experience.

Currently, the always on display has an eight-color mode and a 16.7-mega-color mode. The mobile phone is used as an example. For the eight-color mode, the mobile phone may display only the information such as the clock, the date, and the notification after the screen is turned off. For example, as shown in FIG. 1a, the mobile phone displays only the clock and the date after the screen is turned off. For the 16.7-mega-color mode, after the screen is turned off, the mobile phone may display the information such as the clock, the date, and the notification, and may further display a background wallpaper. For example, as shown in FIG. 1b, the mobile phone displays the clock, the date, and a background wallpaper 100 after the screen is turned off. However, in the prior art, only one mode is configured on the electronic device, which is limited and cannot flexibly meet a user requirement. This reduces a capability of intelligent interaction between the electronic device and a user.

SUMMARY

This application provides an always on display method and an electronic device, to help improve a capability of intelligent interaction between an electronic device and a user.

According to a first aspect, an embodiment of this application provides an always on display method. The method may be implemented on an electronic device having a touchscreen. An always on display mode configured on the electronic device includes a first mode and a second mode. An always on display interface corresponding to the first mode is different from an always on display interface corresponding to the second mode. After the screen is turned off, power consumption of the electronic device displaying in the first mode is lower than power consumption of the electronic device displaying in the second mode. Specifically, the method includes: obtaining, by the electronic device, device status information; automatically determining, from the first mode and the second mode based on the device status information, an always on display mode corresponding to the device status information; and displaying, after the touchscreen is turned off, an always on display interface corresponding to the determined always on display mode. The device status information is information related to a current running state of the electronic device.

In this embodiment of this application, the electronic device can automatically determine the always on display mode based on setting status information. In this way, the electronic device can intelligently determine the always on display mode based on a scenario that the electronic device is currently in. This improves an intelligent interaction capability between the electronic device and a user, and also enhances user experience.

In a possible design, the always on display interface corresponding to the first mode and the always on display interface corresponding to the second mode each include a plurality of different display effects. After determining that a display effect of the always on display interface corresponding to the determined always on display mode is a target display effect, the electronic device displays, based on the target display effect, the always on display interface corresponding to the determined always on display mode. The target display effect is a display effect selected by the user from a plurality of different display effects of the always on display interface corresponding to the determined always on display mode.

The foregoing technical solution helps improve diversity of an always on display interface.

In a possible design, the always on display interface corresponding to the first mode does not include a background wallpaper, but includes at least one of a clock, a date, remaining power, a missed call, and unread SMS message information. The foregoing technical solution helps reduce the power consumption of the electronic device displaying in the first mode.

In a possible design, the always on display interface corresponding to the second mode includes at least one of the clock, the date, the remaining power, the missed call, the unread SMS message information, the background wallpaper, and an application icon. The foregoing technical solution helps improve a cool effect brought by an always on display screen to the user.

In a possible design, the electronic device determines, based on current remaining power and a preset correspondence between the remaining power and a quantity of application icons, a quantity of application icons on the always on display interface corresponding to the second mode. Alternatively, the electronic device determines, based on the current remaining power and a preset correspondence between the remaining power and the application icon, an application icon on the always on display interface corresponding to the second mode. The foregoing technical solution helps improve intelligent interaction between the electronic device and the user, and enhance user experience.

In a possible design, the device status information includes remaining battery power information. Based on the remaining battery power information, the electronic device determines, if it is determined that remaining battery power is less than or equal to a first threshold, that the always on display mode corresponding to the device status information is the first mode; and determines, if it is determined that the remaining battery power is greater than the first threshold, that the always on display mode corresponding to the device status information is the second mode. The foregoing technical solution helps improve standby duration of the electronic device.

In a possible design, the device status information includes screen-on/off frequency information. Based on the screen-on/off frequency information, the electronic device determines, if it is determined that a screen-on/off frequency is less than or equal to a second threshold, that the always on display mode corresponding to the device status information is the first mode; and determines, if it is determined that the screen-on/off frequency is greater than the second threshold, that the always on display mode corresponding to the device status information is the second mode. The foregoing technical solution helps improve reliability of intelligently determining the always on display mode.

In a possible design, the device status information includes a bedtime alarm and a wake-up alarm. The electronic device determines, when a current moment reaches a moment set for the bedtime alarm, that the always on display mode corresponding to the device status information is the first mode; and determines, when the current moment reaches a moment set for the wake-up alarm, that the always on display mode corresponding to the device status information is the second mode. The foregoing technical solution helps improve the reliability of intelligently determining the always on display mode.

In a possible design, the electronic device obtains the device status information after receiving a screen-off operation on the touchscreen. For example, after receiving the screen-off operation on the touchscreen, the electronic device obtains the device status information before the touchscreen is turned off. This technical solution helps improve real-time performance of obtaining the device status information. For another example, the electronic device obtains the device status information after the touchscreen is turned off. This technical solution helps improve a speed of a corresponding screen-off operation.

In a possible design, the device status information further includes at least one of configuration information, a charging status, a geographical location, a quantity of walking steps, and a heart rate of the user. The foregoing technical solution helps improve the reliability of intelligently determining the always on display mode.

In a possible design, the configuration information includes configuration information indicating whether an always on display function and intelligent display are enabled. The configuration information is obtained by the electronic device from an always on display settings interface. The always on display settings interface includes an always on display option, a first mode option, a second mode option, an intelligent mode option, a first virtual button, a second virtual button, a third virtual button, and a fourth virtual button. The first virtual button is used to enable or disable the always on display function. The second virtual button is used to enable or disable the first mode. The third virtual button is used to enable or disable the second mode. The fourth virtual button is used to enable or disable an intelligent mode. The always on display interface corresponding to the second mode includes 16.7 mega colors. The always on display interface corresponding to the first mode includes eight colors. The foregoing technical solution helps improve user control on intelligently determining the always on display mode. For example, the first mode may also be referred to as a simple mode, and the second mode may also be referred to as a multicolor mode.

In a possible design, the device status information is periodically obtained by the electronic device. The foregoing technical solutions help simplify implementation.

In a possible design, the touchscreen is an OLED screen. The foregoing technical solution helps reduce power consumption of the electronic device after the always on display function is enabled.

According to a second aspect, an embodiment of this application provides another always on display method. The method is implemented on an electronic device having a touchscreen. Always on display modes configured on the electronic device are a first mode and a second mode. An always on display interface corresponding to the first mode includes eight colors. An always on display interface corresponding to the second mode includes 16.7 mega colors. The method includes: receiving, by the electronic device, a screen-off operation; if it is determined that configuration information indicates that both an always on display function and intelligent display are enabled and the electronic device is being charged, automatically determining that the always on display mode is the second mode; determining, based on the electronic device being charged, that the always on display interface corresponding to the second mode is a first always on display interface, where the first always on display interface includes a clock, a date, a missed call, missed SMS message information, remaining power, a background wallpaper, and N application icons, the N application icons are icons of top N applications that are most frequently used by a user, N is a positive integer greater than or equal to 1, and a display effect of the first always on display interface is a display effect selected by the user from a plurality of different display effects of the always on display interface corresponding to the second mode; then displaying the first always on display interface on the touchscreen; after the electronic device detects that charging is completed and the electronic device stops charging, if a first geographical location is located, automatically determining that the always on display mode is the second mode; determining, based on that the charging is completed and the electronic device stops charging, that the always on display interface corresponding to the second mode is a second always on display interface, where the second always on display interface includes the clock, the date, the missed call, the missed SMS message information, the background wallpaper, and M application icons, the M application icons are icons of top M applications that are most frequently used by the user, M is a positive integer less than N and greater than or equal to 1, and a display effect of the second always on display interface is a display effect selected by the user from the plurality of different display effects of the always on display interface corresponding to the second mode; switching the first always on display interface to the second always on display interface, and displaying the second always on display interface on the touchscreen;

after a location of the electronic device switches from the first geographical location to a second geographical location, if it is determined that the remaining power is greater than a first threshold and a screen-on/off frequency is less than a second threshold, automatically determining that the always on display mode is the first mode; determining, based on that the remaining power is greater than the first threshold, that the always on display interface corresponding to the first mode is a third always on display interface, where the third always on display interface includes the clock, the date, the missed call, a missed SMS message, and the remaining power, and a display effect of the third always on display interface is a display effect selected by the user from a plurality of different display effects of the always on display interface corresponding to the first mode; switching the second always on display interface to the third always on display interface, and displaying the third always on display interface on the touchscreen;

after the location of the electronic device switches from the first geographical location to the second geographical location, if it is determined that the remaining power is greater than the first threshold, and the screen-on/off frequency is greater than or equal to the second threshold, automatically determining that the always on display mode is the second mode; determining, based on that the remaining power is greater than the first threshold, that the always on display interface corresponding to the second mode is a fourth always on display interface, where the fourth always on display interface includes the clock, the date, the missed call, the missed SMS message, the remaining power, the background wallpaper, and K application icons, the K application icons are icons of top K applications that are most frequently used by the user, K is a positive integer less than M and greater than or equal to 1, and a display effect of the fourth always on display interface is a display effect selected by the user from the plurality of different display effects of the always on display interface corresponding to the second mode; switching from the second always on display interface to the fourth always on display interface, and displaying the fourth always on display interface on the touchscreen;

if the electronic device determines that the remaining power is less than or equal to the first threshold, automatically determining that the always on display mode is the first mode; determining, based on that the remaining power is less than or equal to the first threshold, that the always on display interface corresponding to the first mode is a fifth always on display interface, where the fifth always on display interface includes the clock and the date, and a display effect of the fifth always on display interface is a display effect selected by the user from the plurality of different display effects of the always on display interface corresponding to the first mode; and displaying the fifth always on display interface on the touchscreen.

In this embodiment of this application, the electronic device can automatically determine the always on display mode. In this way, the electronic device can intelligently determine the always on display mode based on a scenario that the electronic device is currently in. This improves an intelligent interaction capability between the electronic device and the user, and also improves user experience.

According to a third aspect, an embodiment of this application provides an electronic device, including an obtaining module, a processing module, a display module and a storage module. The storage module stores an always on display mode. The always on display mode includes a first mode and a second mode. An always on display interface corresponding to the first mode is different from an always on display interface corresponding to the second mode. After a screen is turned off, power consumption of the electronic device displaying in the first mode is lower than power consumption of the electronic device displaying in the second mode. The obtaining module is configured to obtain device status information. The device status information is information related to a current running state of the electronic device. The processing module is configured to automatically determine, from the first mode and the second mode based on the device status information, an always on display mode corresponding to the device status information. The display module is configured to display, after the screen is turned off, an always on display interface corresponding to the determined always on display mode.

In a possible design, the always on display interface corresponding to the first mode and the always on display interface corresponding to the second mode each include a plurality of different display effects.

The processing module is further configured to determine a display effect of the always on display interface corresponding to the determined always on display mode as a target display effect. The target display effect is a display effect selected by a user from a plurality of different display effects of the always on display interface corresponding to the determined always on display mode.

In a possible design, the always on display interface corresponding to the first mode does not include a background wallpaper, but includes at least one of a clock, a date, remaining power, a missed call, and unread SMS message information.

In a possible design, the always on display interface corresponding to the second mode includes at least one of the clock, the date, the remaining power, the missed call, the unread SMS message information, the background wallpaper, and an application icon.

In a possible design, the processing module is further configured to determine, based on current remaining power and a preset correspondence between the remaining power and a quantity of application icons, a quantity of application icons on the always on display interface corresponding to the second mode; or determine, based on the current remaining power and a preset correspondence between the remaining power and the application icon, an application icon on the always on display interface corresponding to the second mode.

In a possible design, the device status information includes remaining battery power information.

Based on the remaining battery power information, the processing module is configured to determine, if it is determined that remaining battery power is less than or equal to a first threshold, that the always on display mode corresponding to the device status information is the first mode; and determine, if it is determined that the remaining battery power is greater than the first threshold, that the always on display mode corresponding to the device status information is the second mode.

In a possible design, the device status information includes screen-on/off frequency information.

Based on the screen-on/off frequency information, the processing module is configured to determine, if it is determined that a screen-on/off frequency is less than or equal to a second threshold, that the always on display mode corresponding to the device status information is the first mode; and determine, if it is determined that the screen-on/off frequency is greater than the second threshold, that the always on display mode corresponding to the device status information is the second mode.

In a possible design, the device status information includes a bedtime alarm and a wake-up alarm.

The processing module is configured to determine, when a current moment reaches a moment set for the bedtime alarm, that the always on display mode corresponding to the device status information is the first mode; and determine, when the current moment reaches a moment set for the wake-up alarm, that the always on display mode corresponding to the device status information is the second mode.

In a possible design, the obtaining module is specifically configured to obtain the device status information after receiving a screen-off operation on a touchscreen. For example, the obtaining module is specifically configured to, after receiving the screen-off operation on the touchscreen, obtain the device status information before the display module turns off the screen. Alternatively, the obtaining module is specifically configured to obtain the device status information after the display module turns off the screen.

In a possible design, the display module is further configured to: after displaying the always on display interface corresponding to the determined always on display mode, display a lock screen on the touchscreen in response to a screen-on operation received by the obtaining module.

In a possible design, the device status information further includes at least one of configuration information, a charging status, a geographical location, a quantity of walking steps, and a heart rate of the user.

In a possible design, the configuration information includes configuration information indicating whether an always on display function and intelligent display are enabled. The configuration information is obtained by the obtaining module from an always on display settings interface. The always on display settings interface includes an always on display option, a first mode option, a second mode option, an intelligent mode option, a first virtual button, a second virtual button, a third virtual button, and a fourth virtual button. The first virtual button is used to enable or disable the always on display function. The second virtual button is used to enable or disable the first mode. The third virtual button is used to enable or disable the second mode. The fourth virtual button is used to enable or disable an intelligent mode. The always on display interface corresponding to the second mode includes 16.7 mega colors. The always on display interface corresponding to the first mode includes eight colors. For example, the first mode is a simple mode, and the second mode is a multicolor mode.

In a possible design, the device status information is periodically obtained by the electronic device.

In a possible design, the display module is an OLED screen.

According to a fourth aspect, an embodiment of this application provides an electronic device, including a touchscreen, one or more processors, a memory, a plurality of applications, and one or more computer programs. The touchscreen includes a touch-sensitive surface and a display. The one or more computer programs are stored in the memory. The one or more computer programs include an instruction, and when the instruction is executed by the electronic device, the electronic device is enabled to perform the method according to the first aspect of the embodiments of this application or any one of the possible designs provided in the first aspect.

According to a fifth aspect, an embodiment of this application provides a computer storage medium. The computer storage medium stores a program, and when the program is run on an electronic device, the electronic device is enabled to perform the method according to the first aspect and any one of the possible designs of the first aspect.

According to a sixth aspect, an embodiment of this application provides a computer program product. When the computer program product is run on an electronic device, the electronic device is enabled to perform the method according to the first aspect and any one of the possible designs of the first aspect.

In addition, for technical effects brought by any possible design manner in the third to the tenth aspects, refer to technical effects brought by different design manners in the first aspect. Details are not described herein again.

DETAILED DESCRIPTION OF ILLUSTRATIVE EMBODIMENTS

The embodiments disclosed in this application may be applied to an electronic device. The following describes the electronic device, a graphical user interface (which may be briefly referred to as GUI below) configured for the electronic device, and embodiments for using the electronic device. In some embodiments of this application, the electronic device may be a portable electronic device, such as a mobile phone, a tablet computer, or a wearable device (for example, a smartwatch) with a wireless communication function, that includes a function such as a personal digital assistant and/or a music player. An example embodiment of the portable electronic device includes but is not limited to a portable electronic device using iOS®, Android®, Microsoft®, or another operating system. The portable electronic device may alternatively be another portable electronic device, for example, a laptop computer (Laptop) with a touch-sensitive surface (for example, a touch panel). It should be further understood that, in some other embodiments of this application, the electronic device may alternatively be a desktop computer with a touch-sensitive surface (for example, a touch panel), but not a portable electronic device.

Figure 2A:
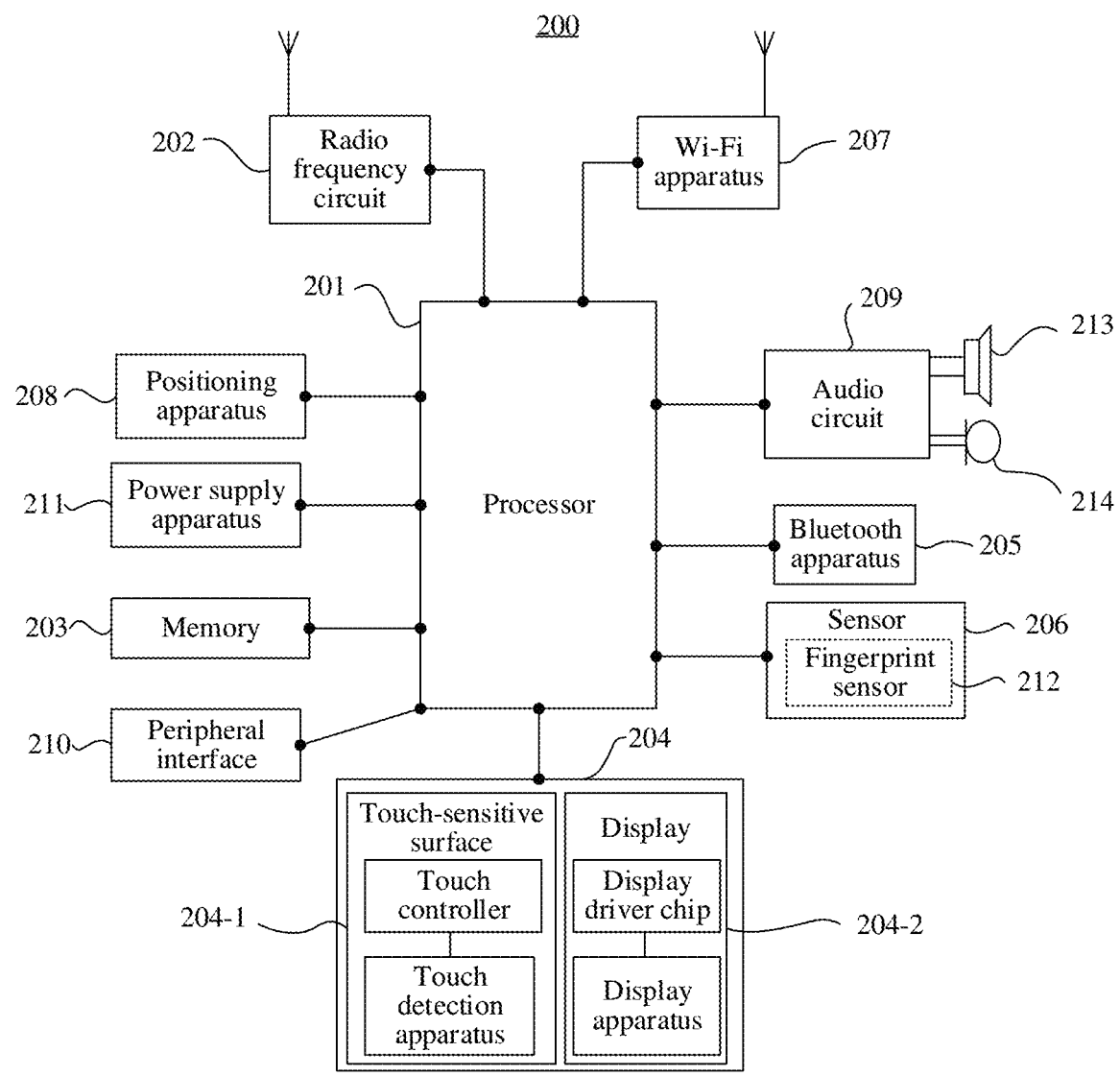
FIG. 2a is a schematic structural diagram of an electronic device to which an embodiment of this application is applicable.

For example, as shown in FIG. 2a, the electronic device in the embodiments of this application may be a mobile phone 200. The following specifically describes an embodiment by using the mobile phone 200 as an example. It should be understood that the mobile phone 200 shown in the figure is merely an example of the electronic device, and the mobile phone 200 may have more or fewer components than those shown in the figure, or may combine two or more components, or may have different component configurations. Various components shown in the figure may be implemented in hardware, software, or a combination of hardware and software that includes one or more signal processing and/or application-specific integrated circuits.

As shown in FIG. 2a, the mobile phone 200 may specifically include components such as one or more processors 201, a radio frequency (Radio Frequency, RF) circuit 202, a memory 203, a touchscreen 204, a Bluetooth apparatus 205, one or more sensors 206, a Wi-Fi apparatus 207, a positioning apparatus 208, an audio circuit 209, a peripheral interface 210, and a power supply apparatus 211. These components may communicate with each other by using one or more communications buses or signal cables (not shown in FIG. 2a). A person skilled in the art may understand that a hardware structure shown in FIG. 2a does not constitute a limitation on the mobile phone 200, and the mobile phone 200 may include more or fewer components than those shown in the figure, may combine some components, or may have different component arrangements.

The following describes in detail the components of the mobile phone 200 with reference to FIG. 2a.

The processor 201 is a control center of the mobile phone 200. The processor 201 is connected to each part of the mobile phone 200 by using various interfaces and lines, and performs various functions of the mobile phone 200 and processes data by running or executing an application (application, App for short) stored in the memory 203, and invoking data and an instruction that are stored in the memory 203. For example, when an always on display function is disabled, the processor 201 may turn off a screen in response to an input of locking the screen by a user if the input of locking the screen by the user is detected. When the always on display function is enabled, if the input of locking the screen by the user is detected, in response to the input of locking the screen by the user, the processor 201 displays, in a specific area, preset information such as a clock, a date, and a notification, and turns off a screen in another area other than the specific area. It should be noted that, in this embodiment of this application, the input of locking the screen by the user may be pressing a physical key (for example, a power key), tapping or double-tapping an icon for locking the screen, a preset gesture operation used to lock the screen, or the like. This is not limited. It should further be noted that always on display may also be referred to as an always on mode, an always on clock, a night clock, or the like. This is not limited. In the embodiments of this application, the always on display is used for description.

In some embodiments, the processor 201 may include one or more processing units. An application processor and a modem processor may be integrated into the processor 201. The application processor mainly processes an operating system, a user interface, an application, and the like, and the modem processor mainly processes wireless communication. It should be understood that the modem processor may not be integrated into the processor 201. For example, the processor 201 may be a Kirin chip 970 manufactured by Huawei Technologies Co., Ltd. In some other embodiments of this application, the processor 201 may further include a fingerprint verification chip, configured to verify a collected fingerprint.

The radio frequency circuit 202 may be configured to receive and send a radio signal in an information receiving and sending process or a call process. Specifically, the radio frequency circuit 202 may receive downlink data from a base station, and then send the downlink data to the processor 201 for processing. In addition, the radio frequency circuit 202 may further send uplink-related data to the base station. Generally, the radio frequency circuit 202 includes but is not limited to an antenna, at least one amplifier, a transceiver, a coupler, a low noise amplifier, a duplexer, and the like. In addition, the radio frequency circuit 202 may further communicate with another device through wireless communication. The wireless communication may use any communications standard or protocol, including but not limited to a global system for mobile communications, a general packet radio service, code division multiple access, wideband code division multiple access, long term evolution, an email, an SMS message service, and the like.

The memory 203 is configured to store an application and data. The processor 201 runs the application and the data that are stored in the memory 203, to perform the various functions of the mobile phone 200 and data processing. The memory 203 mainly includes a program storage area and a data storage area. The program storage area may store the operating system, an application required by at least one function (for example, a sound playing function and an image playing function), and the like. The data storage area may store data (for example, audio data and a phone book) created based on use of the mobile phone 200. In addition, the memory 203 may include a high speed random access memory, and may further include a non-volatile memory, for example, a magnetic disk storage device, a flash memory device, or another non-volatile solid-state storage device. The memory 203 may store various operating systems such as an iOS® operating system developed by Apple and an Android@ operating system developed by Google. For example, the memory 203 stores an application, data, and the like related to this embodiment of this application, for example, a background wallpaper, the clock, and the date. It should be noted that the background wallpaper, the clock, the date, and the like in this embodiment of this application may alternatively be stored in a cloud, and the mobile phone 100 obtains the background wallpaper, the date, the clock, and the like from the cloud.

The touchscreen 204 may include a touch-sensitive surface 204-1 and a display 204-2. The touch-sensitive surface 204-1 (for example, a touch panel) may collect a touch event performed by the user of the mobile phone 200 on or near the touch-sensitive screen 204-1 (for example, an operation performed by the user on the touch-sensitive surface 204-1 or near the touch-sensitive surface 204-1 by using any suitable object such as a finger or a stylus), and send collected touch information to another component, for example, the processor 201. The touch event performed by the user near the touch-sensitive surface 204-1 may be referred to as a floating touch. The floating touch may mean that the user does not need to directly come into contact with a touchpad to select, move, or drag a target (for example, an App icon), and the user only needs to be near the electronic device to perform a wanted function. In an application scenario of the floating touch, terms such as "touch" and "contact" do not imply a direct contact with the touchscreen 204, but a contact near or close to the touchscreen 204. The touch-sensitive surface 204-1 on which the floating touch can be performed may be implemented on a capacitive type, an infrared light sensing type, an ultrasonic wave type, or the like. The touch-sensitive surface 204-1 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into touch point coordinates, and sends the touch point coordinates to the processor 201. The touch controller may further receive an instruction sent by the processor 201, and execute the instruction. In addition, the touch-sensitive surface 204-1 may be implemented on a plurality of types such as a resistive type, a capacitive type, an infrared type, or a surface acoustic wave type.

The display (also referred to as a display screen) 204-2 may be configured to display information entered by the user or information provided for the user, and various menus of the mobile phone 200. For example, the display 204-2 may further include two parts: a display driver chip and a display apparatus. The display driver chip is configured to receive a signal or data sent by the processor 201, to drive a corresponding screen to be displayed on the display apparatus. For example, when detecting an event that remaining power is less than 20%, the processor 201 matches an always on display mode to a simple mode in response to the event. If the processor 201 detects the input of locking the screen by the user, in response to the input of locking the screen by the user, the processor 201 sends, based on the simple mode, to-be-displayed related information (for example, a style for displaying the to-be-displayed information, brightness, and a power sequence for turning on and off the screen) to the display driver chip. After receiving the to-be-displayed related information sent by the processor, the display driver chip processes the information, and drives, based on the processed information, the display apparatus to turn on a corresponding pixel and turn off another corresponding pixel, to implement the always on display in the simple mode.

For example, in this embodiment of this application, the display apparatus may be configured by using an organic light-emitting diode (organic light-emitting diode, OLED). For example, an active matrix organic light emitting diode (active matrix organic light emitting diode, AMOLED) is used to configure the display apparatus. In this case, the display driver chip receives related information that is to be displayed after the screen is turned off and that is sent by the processor, processes the to-be-displayed related information, and drives some OLED lights to be turned on and the remaining OLEDs to be turned off, to implement the always on display function.

The touch-sensitive surface 204-1 may cover the display 204-2. After detecting the touch event on or near the touch-sensitive surface 204-1, the touch-sensitive surface 204-1 transmits the touch event to the processor 201 to determine a type of the touch event. Then, the processor 201 may provide corresponding visual output on the display 204-2 based on the type of the touch event. Although in FIG. 2a, the touch-sensitive surface 204-1 and the display screen 204-2 are used as two independent components to implement input and output functions of the mobile phone 200, in some embodiments, the touch-sensitive surface 204-1 and the display screen 204-2 may be integrated to implement the input and output functions of the mobile phone 200. It may be understood that the touchscreen 204 is formed by stacking a plurality of layers of materials. Only the touch-sensitive surface (layer) and the display screen (layer) are presented in this embodiment of this application, and other layers are not described in detail in this embodiment of this application. In addition, in some other embodiments of this application, the touch-sensitive surface 204-1 may cover the display 204-2, and a size of the touch-sensitive surface 204-1 is greater than a size of the display screen 204-2. Therefore, the display screen 204-2 is entirely covered by the touch-sensitive surface 204-1. Alternatively, the touch-sensitive surface 204-1 may be disposed on a front side of the mobile phone 200 in a full panel form. In other words, any touch performed by the user on the front side of the mobile phone 200 can be sensed by the mobile phone. In this way, full touch control experience on the front side of the mobile phone can be implemented. In some other embodiments, the touch-sensitive surface 204-1 is disposed on the front side of the mobile phone 200 in a full panel form, and the display screen 204-2 may alternatively be disposed on the front side of the mobile phone 200 in a full panel form. In this way, a bezel-less structure can be implemented on the front side of the mobile phone. In some other embodiments of this application, the touchscreen 204 may further include a series of pressure sensor arrays, so that the mobile phone can sense pressure exerted on the touchscreen 204 by the touch event.

The mobile phone may further include the Bluetooth apparatus 205, configured to exchange data between the mobile phone 200 and another electronic device (for example, a mobile phone or a smartwatch) over a short distance. In the embodiments of this application, the Bluetooth apparatus may be an integrated circuit, a Bluetooth chip, or the like.

The mobile phone 200 may further include at least one type of sensor 206, such as an optical sensor, a motion sensor, and another sensor. Specifically, the optical sensor may include an ambient light sensor and a proximity sensor. The ambient light sensor may adjust luminance of the display of the touchscreen 204 based on ambient light intensity. The proximity sensor may power off the display when the mobile phone 200 is moved to an ear. As one type of the motion sensor, an accelerometer sensor may detect a value of acceleration in each direction (generally, three axes), and detect a value and a direction of gravity when the accelerometer sensor in static mode, and may be applied to an application for identifying a mobile phone posture (such as screen switching between a landscape mode and a portrait mode, a related game, and magnetometer posture calibration), a function related to vibration recognition (for example, a pedometer, or a knock), and the like.

In some embodiments of this application, the sensor 206 may further include a fingerprint sensor 212. For example, the fingerprint sensor 212 may be disposed on a rear side of the mobile phone 200 (for example, below a rear-facing camera), or the fingerprint sensor 212 may be disposed on the front side of the mobile phone 200 (for example, below the touchscreen 204). In addition, the fingerprint sensor 212 may be disposed on the touchscreen 204 to implement a fingerprint recognition function. In other words, the fingerprint sensor 212 may be integrated with the touchscreen 204 to implement the fingerprint recognition function of the mobile phone 200. In this case, the fingerprint sensor 212 may be disposed on the touchscreen 204 as a part of the touchscreen 204, or may be disposed on the touchscreen 204 in another manner. In addition, the fingerprint sensor 212 may be further implemented as a full-panel fingerprint sensor. In this case, the touchscreen 204 may be considered as a panel on which a fingerprint may be collected at any position. In some possible embodiments, after collecting a fingerprint, the fingerprint sensor 212 may process the fingerprint (for example, by performing fingerprint verification), and send a fingerprint processing result (for example, whether the fingerprint verification succeeds) to the processor 201, so that the processor 201 can perform corresponding processing based on the fingerprint processing result. In some other possible embodiments, the fingerprint sensor 212 may send the collected fingerprint to the processor 201, so that the processor 201 may process the fingerprint (for example, by performing the fingerprint verification). In this embodiment of this application, any type of sensing technology may be used for the fingerprint sensor 212, including but not limited to an optical sensing technology, a capacitive sensing technology, a piezoelectric sensing technology, an ultrasonic sensing technology, and the like. In addition, for a specific technical solution of integrating the fingerprint sensor into the touchscreen in this embodiment of this application, refer to patent application No. US 2015/0036065 A1, entitled "FINGERPRINT SENSOR IN ELECTRONIC DEVICE", announced by the United States Patent and Trademark Office, and all controls of the apparatus are combined in the embodiments of this application by reference.

Other sensors such as a gyroscope, a barometer, a hygrometer, a thermometer, and an infrared sensor may be further disposed on the mobile phone 200. Details are not described herein.

The Wi-Fi apparatus 207 is configured to provide the mobile phone 200 with network access that complies with a related Wi-Fi standard protocol. The mobile phone 200 may access a Wi-Fi access point by using the Wi-Fi apparatus 207, to help the user receive and send an email, browse a web page, access streaming media, and the like. The Wi-Fi apparatus 207 provides wireless broadband internet access for the user. In some other embodiments, the Wi-Fi apparatus 207 may alternatively serve as the Wi-Fi wireless access point, and may provide Wi-Fi network access for another electronic device.

The positioning apparatus 208 is configured to provide a geographic location for the mobile phone 200. It can be understood that the positioning apparatus 208 may be specifically a receiver of a positioning system, such as a global positioning system (global positioning system, GPS) or a BeiDou navigation satellite system. After receiving the geographical location sent by the positioning system, the positioning apparatus 208 sends the information to the processor 201 for processing, or sends the information to the memory 203 for storage. In some other embodiments, the positioning apparatus 208 may be a receiver of an assisted global positioning system (assisted global positioning system, AGPS). The AGPS runs in a manner in which GPS positioning is performed with specific assistance. By using a signal of the base station together with a GPS satellite signal, the AGPS can enable a positioning speed of the mobile phone 200 to be higher. In the AGPS system, the positioning apparatus 208 may obtain positioning assistance through communication with an assisted positioning server (for example, a positioning server on the mobile phone 200). The AGPS system assists the positioning apparatus 208 as an assisted server, to implement ranging and positioning services. In this case, the assisted positioning server communicates with a positioning apparatus (namely, a GPS receiver) of the electronic device such as the positioning apparatus 208 of the mobile phone 200 by using a wireless communications network, to provide positioning assistance. In some other embodiments, the positioning apparatus 208 may alternatively be a positioning technology based on the Wi-Fi access point. Each Wi-Fi access point has a globally unique MAC address, and the electronic device may scan and collect a broadcast signal of a surrounding Wi-Fi access point when Wi-Fi is enabled. Therefore, the electronic device may obtain a MAC address broadcast by the Wi-Fi access point. The electronic device sends such data (for example, the MAC address) that can identify the Wi-Fi access point to a location server by using the wireless communications network. The location server retrieves a geographical location of each Wi-Fi access point, calculates a geographical location of the electronic device with reference to strength of the Wi-Fi broadcast signal, and sends the geographical location of the electronic device to the positioning apparatus 208 of the electronic device.

The audio circuit 209, the loudspeaker 213, and the microphone 214 may provide an audio interface between the user and the mobile phone 200. The audio circuit 209 may transmit an electrical signal converted from received audio data to the loudspeaker 213, and the loudspeaker 213 converts the electrical signal into a sound signal for outputting. In addition, the microphone 214 converts a collected sound signal into an electrical signal, and the audio circuit 209 converts the electrical signal into audio data after receiving the electrical signal, and then outputs the audio data to the radio frequency circuit 202 to send the audio data to, for example, a mobile phone, or outputs the audio data to the memory 203 for further processing.

The peripheral interface 210 is configured to provide various interfaces for an external input/output device (for example, a keyboard, a mouse, a display externally connected to the mobile phone, an external memory, or a subscriber identity module card). For example, a mouse is connected by using a universal serial bus interface, and a subscriber identity module (subscriber identity module, SIM) card provided by a telecommunications operator is connected by using a metal contact in a subscriber identity module card slot. The peripheral interface 210 may be configured to couple the external input/output peripheral device to the processor 201 and the memory 203.

The mobile phone 200 may further include the power supply apparatus 211 for example, a battery and a power supply management chip) that supplies power to the components. The battery may be logically connected to the processor 201 by using the power supply management chip, so that functions such as charging management, discharging management, and power consumption management are implemented by using the power supply apparatus 211.

Although not shown in FIG. 2a, the mobile phone 200 may further include a camera, for example, a front-facing camera or a rear-facing camera. The front-facing camera may be configured to capture facial feature information, and the processor 201 may perform facial recognition on the facial feature information, to perform subsequent processing. The mobile phone 200 may further include a flash, a micro projection apparatus, a near field communication (near field communication, NFC) apparatus, and the like. Details are not described herein.

The following embodiments may be all implemented on an electronic device (for example, the mobile phone 200 or a tablet computer) with the foregoing hardware structure.

Figure 2B:
FIG. 2b is a schematic diagram of a possible user interface according to this application.

For example, FIG. 2b is a graphical user interface (graphical user interface, GUI) displayed on the touchscreen 204 of the mobile phone 200. The GUI may include a status bar 213, a collapsible navigation bar 216, a time and weather Widget 214, and icons of a plurality of applications, for example, an icon 215 of a camera. The status bar 213 may include a name of an operator (China Mobile), a mobile network (4G), time, and remaining power. The navigation bar 216 may include a back (back) key icon, a home screen key icon, a forward key icon. In addition, it may be understood that in some other embodiments, the status bar 213 may further include a Bluetooth icon, a Wi-Fi icon, an external device icon, and the like. It may further be understood that, in some other embodiments, the interface shown in FIG. 2b may further include a Dock bar, and the Dock bar may include an icon of a frequently used App and the like. After the mobile phone detects a touch event of a finger (or a stylus, or the like) of the user on an App icon, in response to the touch event, the mobile phone may open a user interface of an App corresponding to the App icon. For example, after detecting an event that the finger of the user touches the camera icon 216, the mobile phone opens a user interface of the camera in response to the event that the finger of the user touches the camera icon 216.

In some other embodiments, the electronic device may further include a home screen key. The home screen key may be a physical key, or may be a virtual key. The home screen key is configured to return, based on an operation of the user, to a page of the home screen from the GUI displayed on the touchscreen, so that the user may conveniently view the home screen and perform an operation on a control (for example, an icon) on the home screen at anytime. The operation may be specifically that the user presses the home screen key, or the user presses the home screen key twice in a short time period, or the user presses and holds the home screen key. In some other embodiments of this application, the home screen key may further integrate the fingerprint sensor 212. Therefore, when the user presses the home screen key, the electronic device may collect a fingerprint to confirm an identity of the user.

The following describes in detail the embodiments of this application by using the mobile phone 200 shown in FIG. 2a as an example.

To enable the always on display function to more flexibly meet different user requirements, in this embodiment of this application, at least two modes are configured for the always on display function of the mobile phone 200. After the always on display function is enabled on the mobile phone, the mobile phone may automatically switch between the at least two modes based on a user setting or a system default setting. For example, the always on display function of the mobile phone 200 may be configured with a simple mode (which may also be referred to as a low power consumption mode) and a multicolor mode. In some embodiments of this application, the mobile phone 200 may display only the clock and the date after the screen is turned off in the simple mode. Therefore, power consumption of the mobile phone 200 in the simple mode is relatively low. In some other embodiments of this application, in addition to displaying the clock and the date, the mobile phone 200 in the simple mode may further display notification information of basic applications such as the remaining power, a missed call, and an SMS message reminder, and does not display notification information of a third-party application such as WeChat or Alipay. It should be understood that, in the simple mode, to reduce power consumption, an always on display screen may include a relatively small quantity of colors. For example, when the mobile phone 200 is in the simple mode, a screen displayed after the screen is turned off may include eight colors. When the always on display screen includes eight colors, the simple mode may also be referred to as an eight-color mode. A name of the simple mode is not limited in this embodiment of this application. In multicolor mode, in addition to displaying the clock, the date, the remaining power, the missed call, and the SMS message reminder, the mobile phone 200 may further display a notification of the third-party application such as an unread WeChat message, and a background wallpaper. Therefore, power consumption of the mobile phone 200 in multicolor mode is relatively high. It should be understood that, in multicolor mode, to bring a colorful visual effect to the user, in some examples, the screen after the screen is turned off may include a relatively large quantity of colors. For example, when the mobile phone 200 is in multicolor mode, the screen displayed after the screen is turned off may include 16.7 mega colors. When the always on display screen includes 16.7 mega colors, the multicolor mode may also be referred to as a 16.7-mega-color mode. A name of the multicolor mode is not limited in this embodiment of this application.

The following describes in detail an always on display method in an embodiment of this application by using an example in which always on display modes configured in the mobile phone 200 are the simple mode and the multicolor mode.

Figure 3:
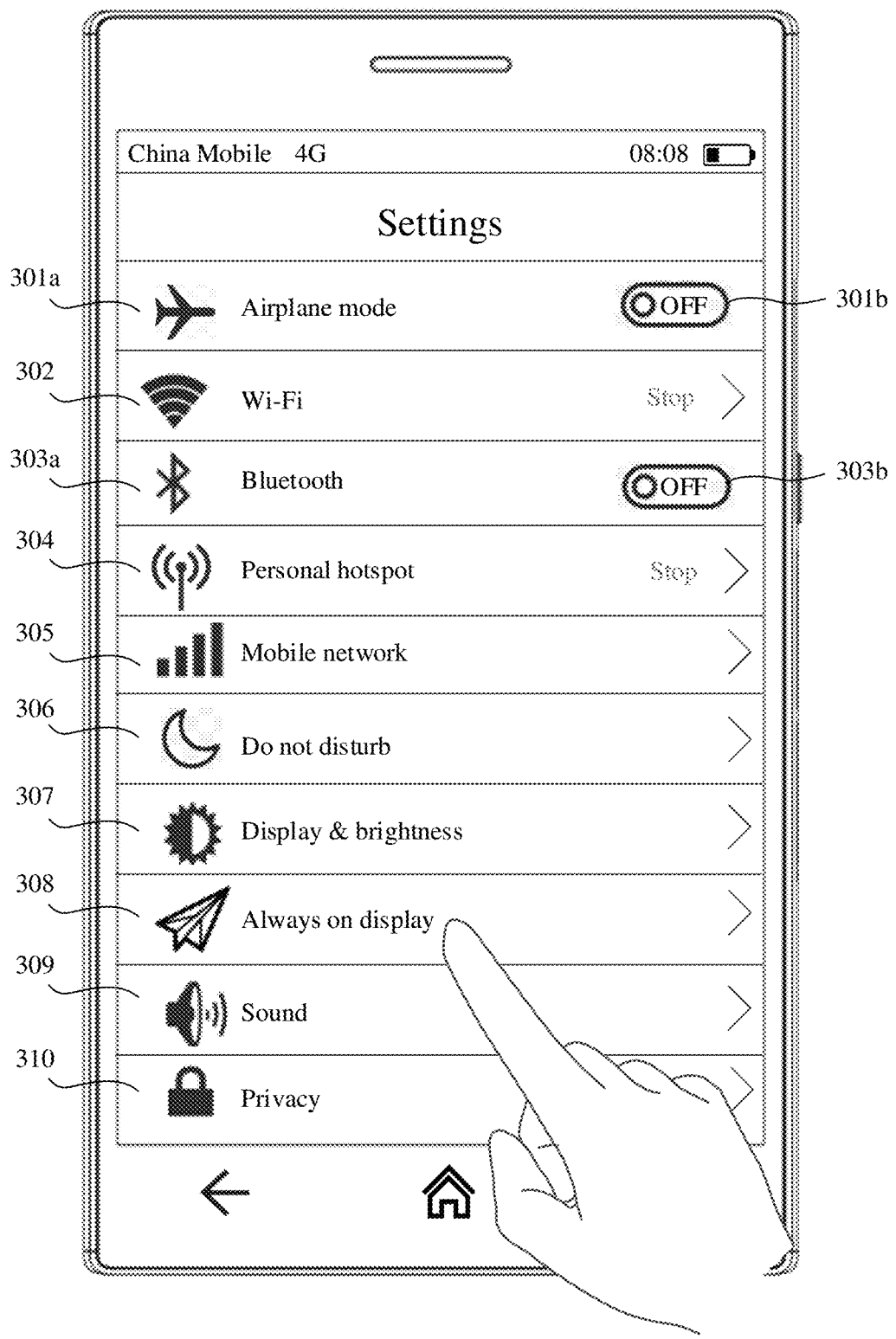
FIG. 3 is a schematic diagram of a possible system settings interface according to this application.

For example, FIG. 3 shows a system settings interface of the mobile phone 200. The system settings interface includes an airplane mode option 301a and a virtual button 301b, a Wi-Fi option 302, a Bluetooth option 303a and a virtual button 303b, a personal hotspot option 304, a mobile network option 305, a Do Not Disturb mode option 306, a display and brightness option 307, an always on display option 308, a sound option 309, a privacy option 310, and the like. The virtual button 301b is used to enable or disable an airplane mode function, and the virtual button 303b is used to enable or disable a Bluetooth function. When detecting an operation of touching the always on display option 308 by the user, the mobile phone 200 displays, in response to the operation, a settings interface of an always on display function on the touchscreen. In the system settings interface shown in FIG. 3, the virtual button 301b and the virtual button 303b are disabled. After detecting a touch on the always on display option 308 of the system settings interface, the mobile phone 200 displays the settings interface of the always on display function.

Figure 4A:
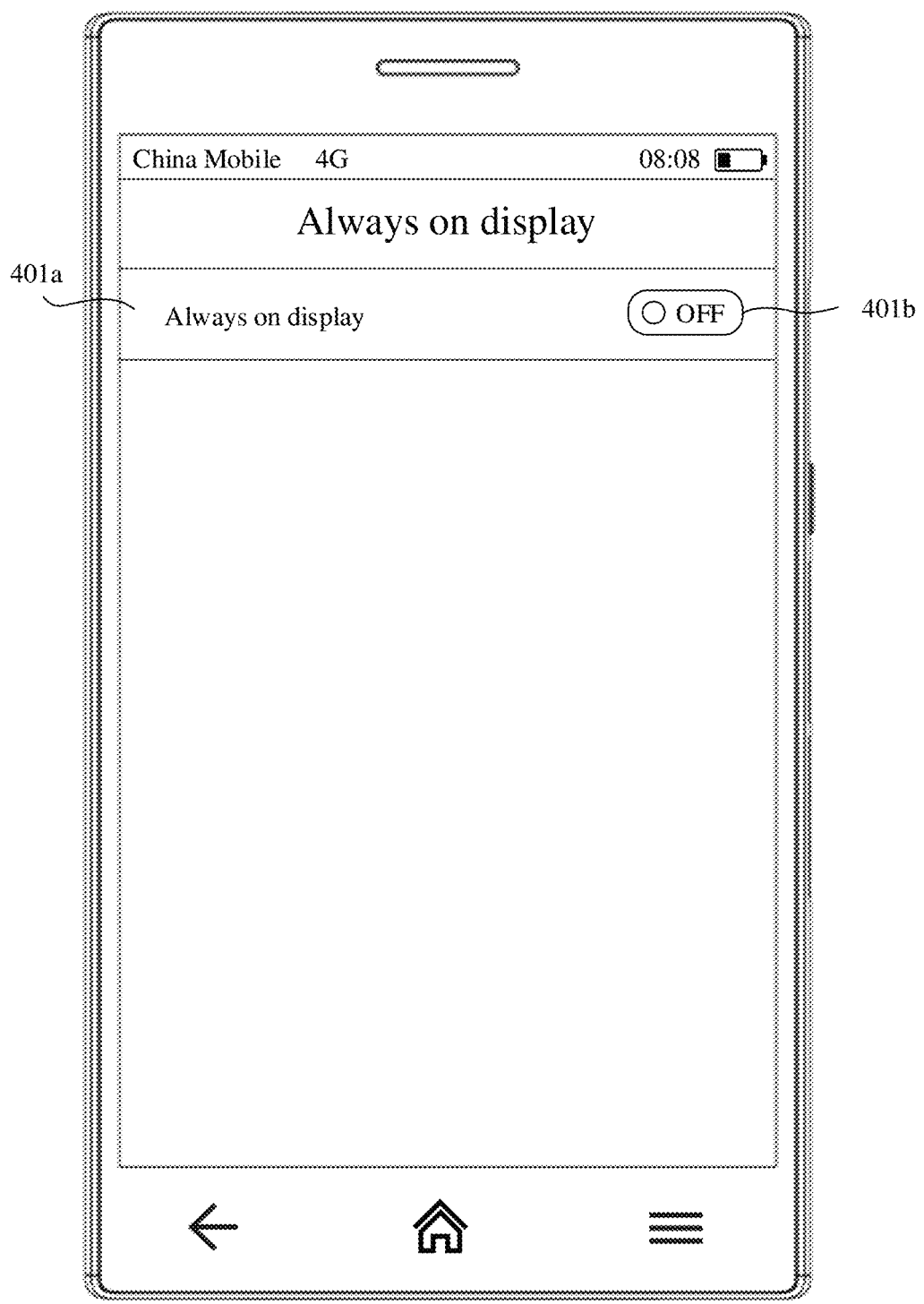
FIG. 4a is a schematic diagram of a possible always on display settings interface according to this application.
Figure 4B:
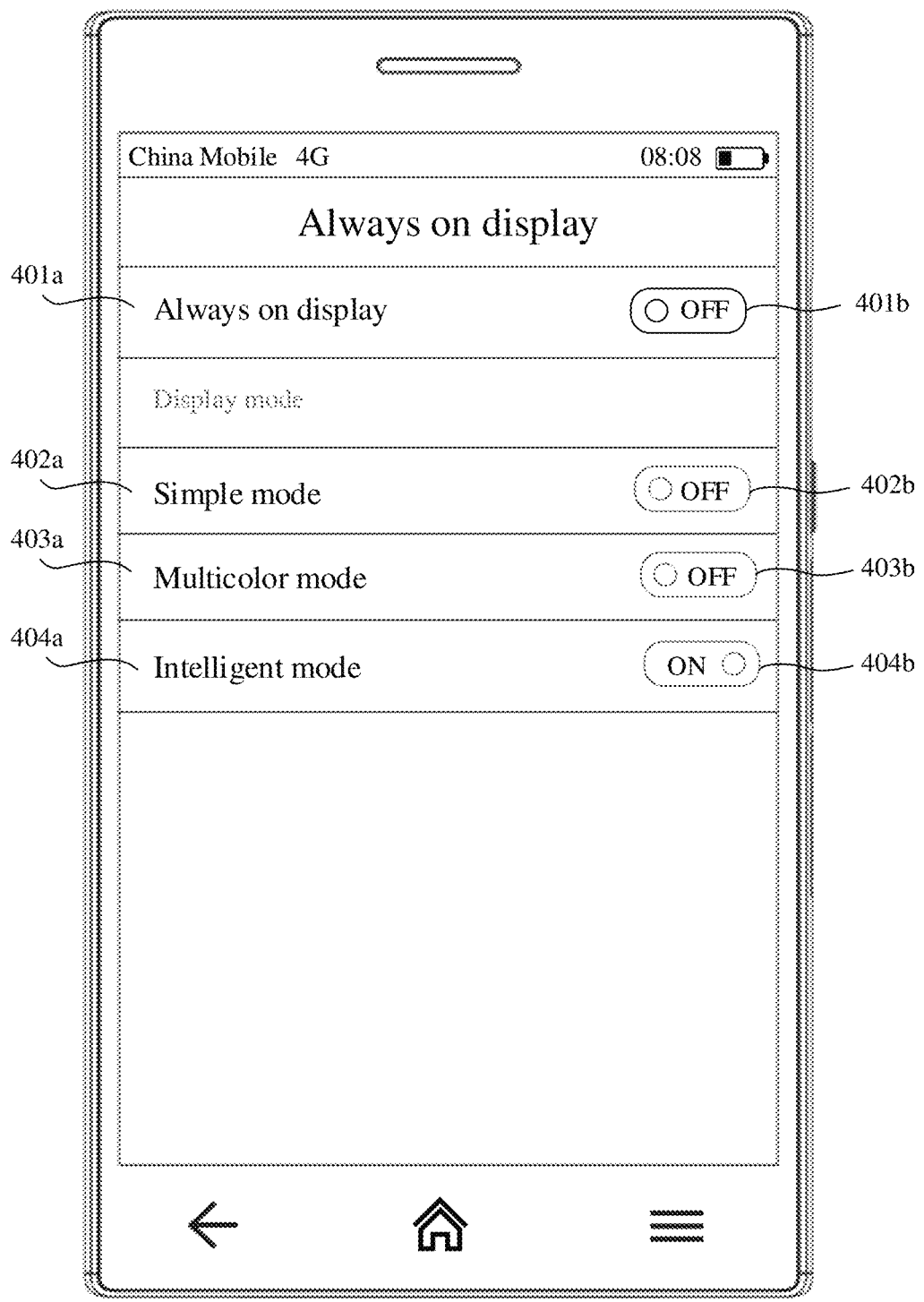
FIG. 4b is a schematic diagram of another possible always on display settings interface according to this application.

For example, when the always on display function is disabled, the settings interface of the always on display function may be shown in FIG. 4a. The settings interface of the always on display function may include an always on display option 401a and a virtual button 401b. The virtual button 401b is used to enable or disable the always on display function. In addition, for example, when the always on display function is disabled, the settings interface of the always on display function may alternatively be shown in FIG. 4b. The settings interface of the always on display function may include the always on display option 401a and the virtual button 401b, a simple mode option 402a and a virtual button 402b, a multicolor mode option 403a and a virtual button 403b, an intelligent mode 404a and a virtual button 404b. The virtual button 401b is used to enable or disable the always on display function. The virtual button 402*b* is used to enable or disable a simple mode. The virtual button 403*a* is used to enable or disable a multicolor mode. The virtual button 404*b* is used to enable or disable an intelligent mode. On the settings interface of the always on display function shown in FIG. 4*b*, when the virtual button 401*b* is disabled, the virtual button 402*b*, the virtual button 403*b*, and the virtual button 404*b* are dimmed, and the user cannot perform an operation on the virtual button 402*b*, the virtual button 403*b*, and the virtual button 404*b*.

Figure 4C:
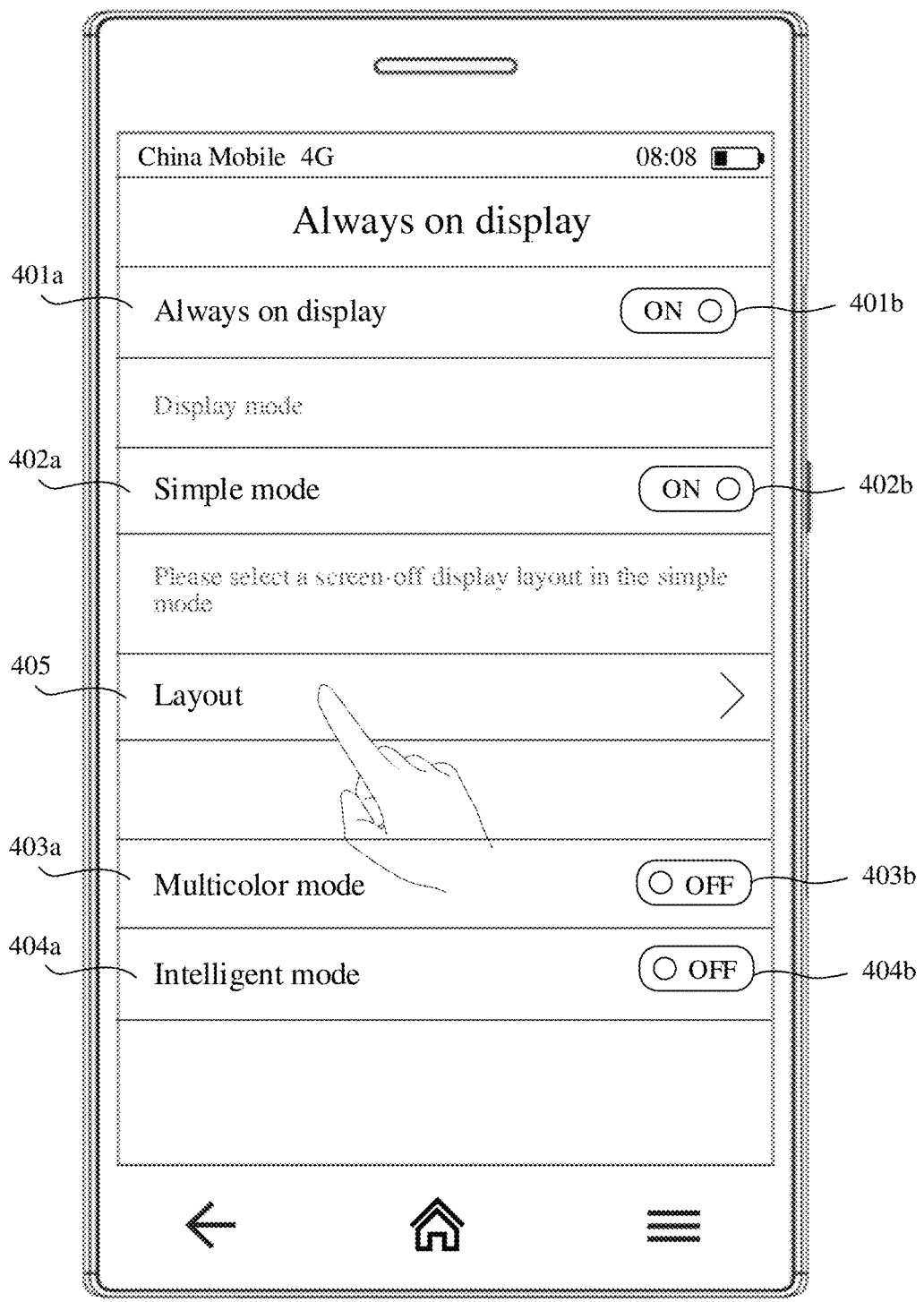
FIG. 4c is a schematic diagram of still another possible always on display settings interface according to this application.

For example, when the always on display function is enabled, the settings interface of the always on display function may be shown in FIG. 4*c*. The always on display settings interface may include the always on display option 401*a* and the virtual button 401*b*, the simple mode option 402*a* and the virtual button 402*b*, the multicolor mode option 403*a* and the virtual button 403*b*, the intelligent mode option 404*a* and the virtual button 404*b*, and a layout option 405. The virtual button 401*b* is used to enable or disable the always on display function. The virtual button 402*b* is used to enable or disable the simple mode. The virtual button 403*a* is used to enable or disable the multicolor mode. The virtual button 404*b* is used to enable or disable the intelligent mode. The virtual button 401*b* and the virtual button 402*b* are on (ON). The virtual button 403*b* and the virtual button 404*b* are off (OFF). In a scenario of the settings interface of the always on display function shown in FIG. 4*c*, after detecting a touch on the layout option 405, the mobile phone 200 may display a layout settings interface on the touchscreen. For example, a displayed layout settings interface is shown in FIG. 4*d*.

Figure 1A:
FIG. 1a is a schematic diagram of a possible always on display interface.
Figure 4D:
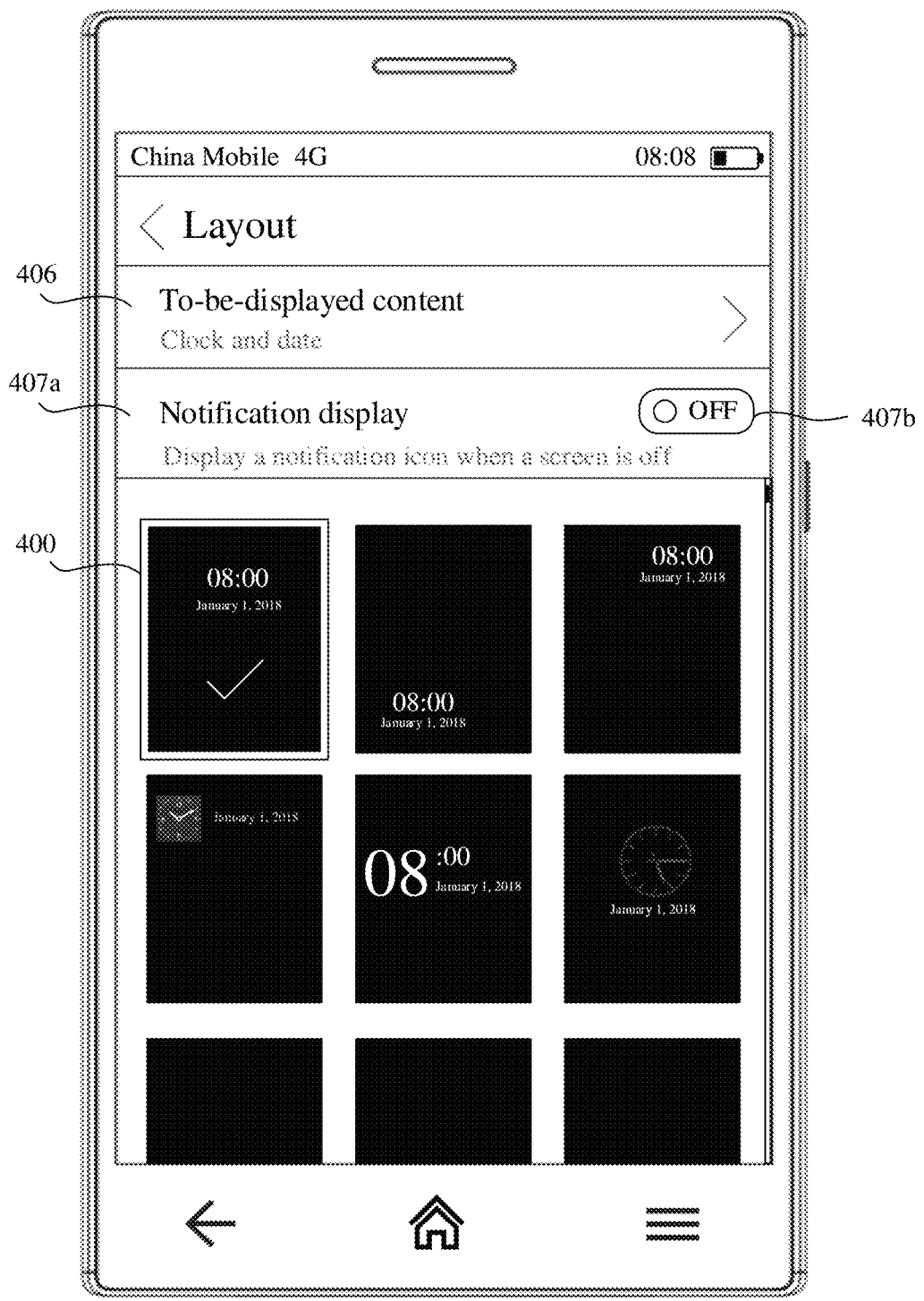
FIG. 4d is a schematic diagram of a possible layout settings interface according to this application.

The layout settings interface shown in FIG. 4*d* is used as an example. The layout settings interface includes a to-be-displayed content option 406, a notification display option 407*a* and a virtual button 407*b*, and a plurality of display effect options of the always on display interface. The virtual button 407*b* is used to enable or disable a notification display function. A display effect option 400 of the always on display interface is a display effect of the always on display interface selected by the user. In a scenario of the layout settings interface shown in FIG. 4*d*, after the screen of the mobile phone 200 is turned off, display is performed based on the display effect option 400 of the always on display interface selected by the user. For example, the display effect of the always on display interface selected by the user is 400. After the screen of the mobile phone 200 is turned off, a displayed always on display interface is shown in FIG. 1*a*, including a clock (08:00) and a date (Jan. 1, 2018), and a display effect of the clock (08:00) and the date (Jan. 1, 2018) is a display effect shown by the display effect option 400.

Figure 4E:
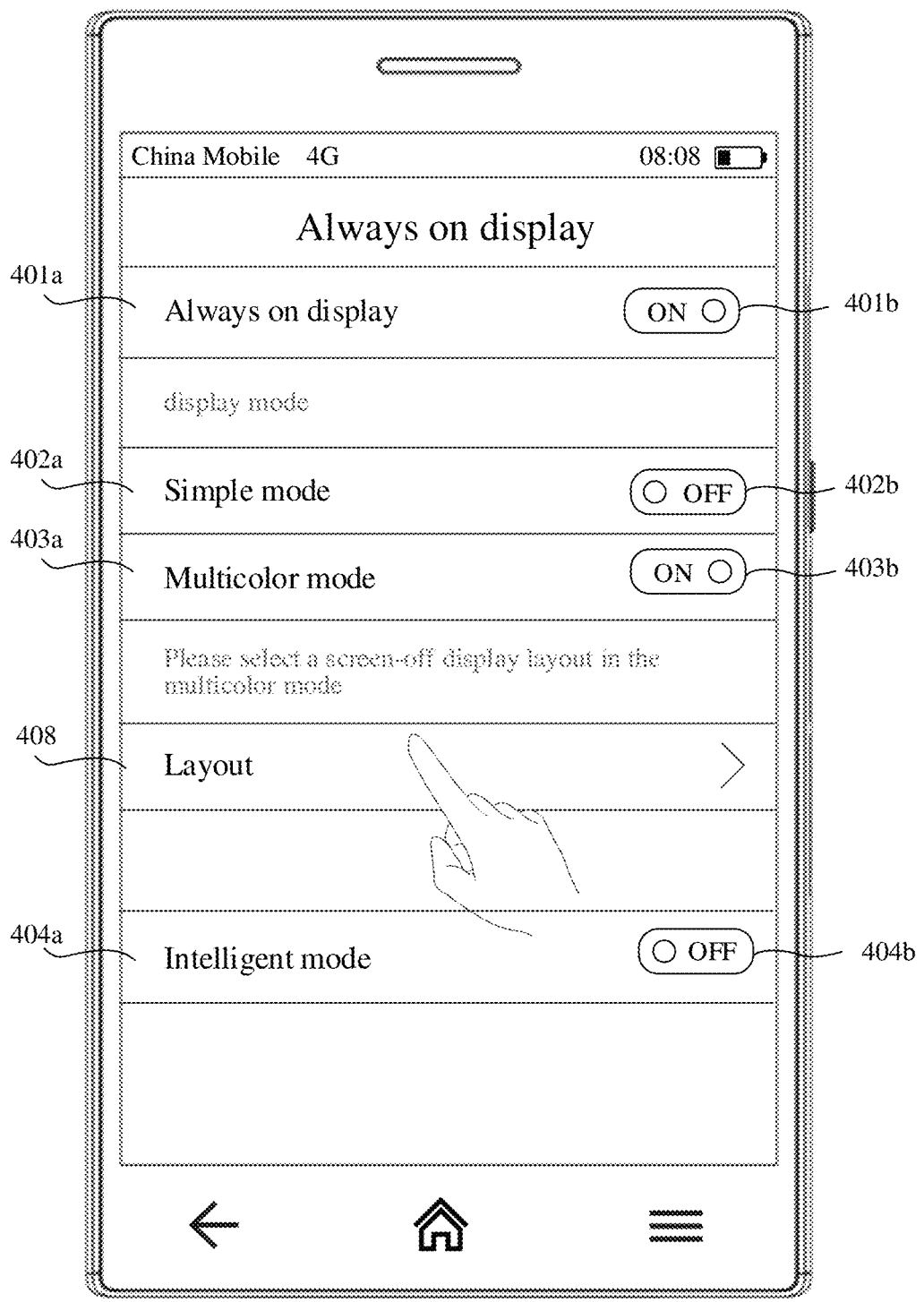
FIG. 4e is a schematic diagram of yet another possible always on display settings interface according to this application.

For another example, when the always on display function is enabled, the settings interface of the always on display function may be shown in FIG. 4*e*. The always on display settings interface may include the always on display option 401*a* and the virtual button 401*b*, the simple mode option 402*a* and the virtual button 402*b*, the multicolor mode option 403*a* and the virtual button 403*b*, the intelligent mode option 404*a* and the virtual button 404*b*, and a layout option 408. The virtual button 401*b* is used to enable or disable the always on display function. The virtual button 402*b* is used to enable or disable the simple mode. The virtual button 403*a* is used to enable or disable the multicolor mode. The virtual button 404*b* is used to enable or disable the intelligent mode. The virtual button 401*b* and the virtual button 403*b* are on (ON). The virtual button 402*b* and the virtual button 404*b* are off (OFF). In a scenario of the settings interface of the always on display function shown in FIG. 4*e*, after detecting a touch on the layout option 408, the mobile phone 200 may display a layout settings interface on the touchscreen. For example, the displayed layout settings interface is shown in FIG. 4*f*.

Figure 1B:
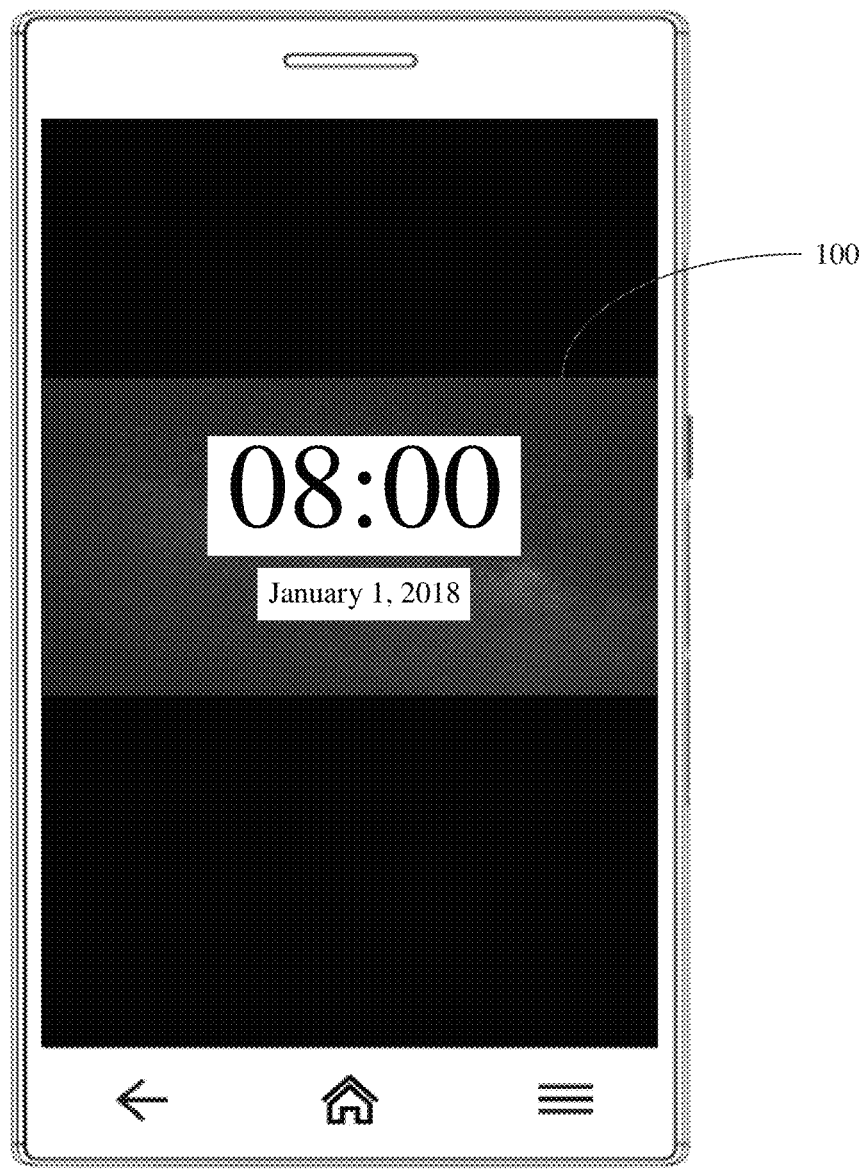
FIG. 1b is a schematic diagram of another possible always on display interface.
Figure 4F:
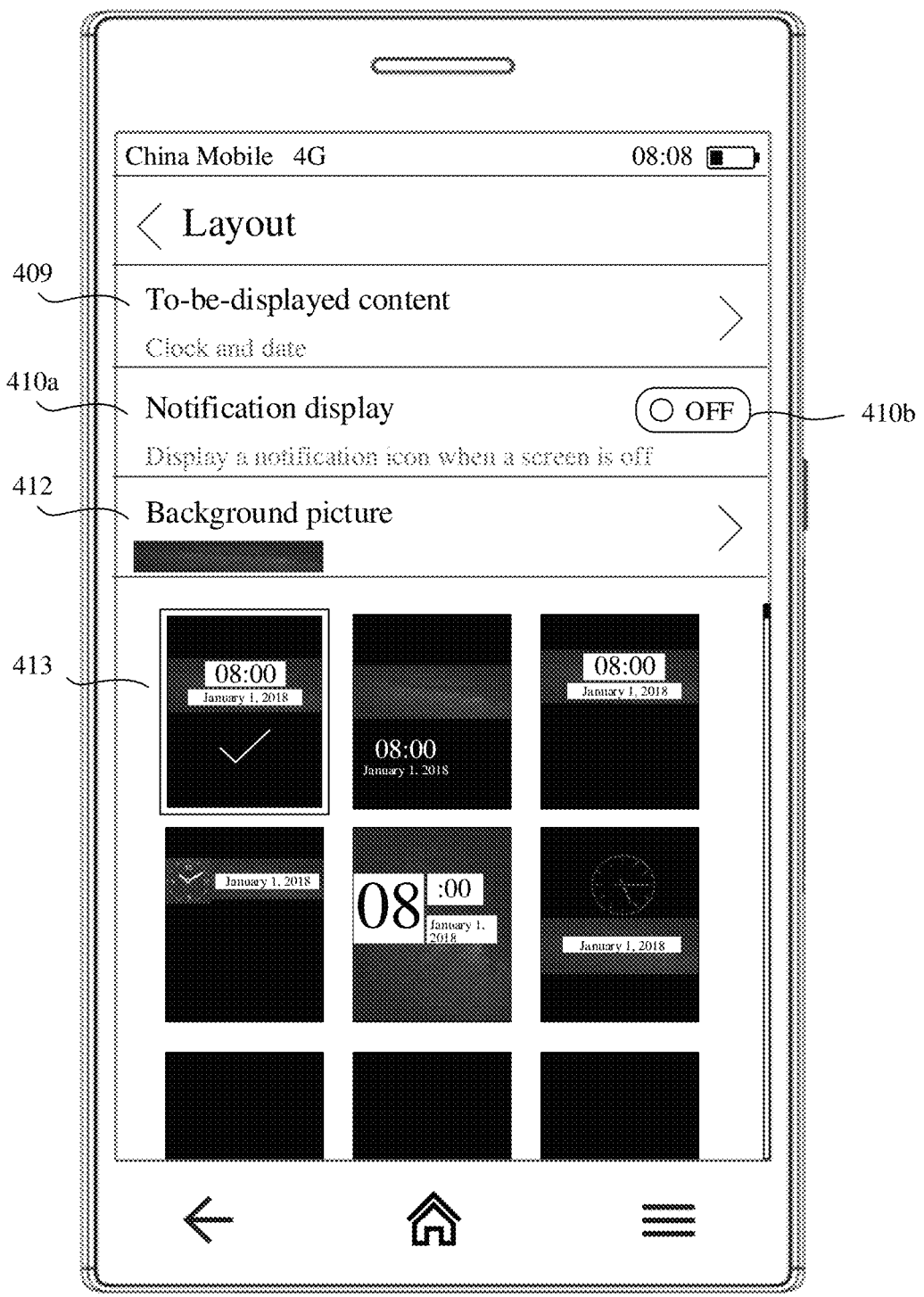
FIG. 4f is a schematic diagram of another possible layout settings interface according to this application.

The layout settings interface shown in FIG. 4*f* is used as an example. The layout settings interface includes a to-be-displayed content option 409, a notification display option 410*a* and a virtual button 410*b*, a background picture option 412, and the plurality of display effect options of the always on display interface. The virtual button 410*b* is used to enable or disable a notification display function. A display effect option 413 is a display effect of the always on display interface selected by the user. In a scenario of the layout settings interface shown in FIG. 4*f*, after the screen of the mobile phone 200 is turned off, display is performed based on the display effect option 413 selected by the user. For example, the display effect selected by the user is 413. After the screen of the mobile phone 200 is turned off, a displayed always on display interface is shown in FIG. 1*b*, including the clock (08:00), the date (Jan. 1, 2018), and a background picture, and a display effect of the clock (08:00), the date (Jan. 1, 2018), and the background picture is a display effect shown by the display effect option 413.

For the user, based on a requirement of the user, the user may manually enable the simple mode and disable the multicolor mode on the device screen of the always on display function, or may manually enable the multicolor mode and disable the simple mode on the settings interface of the always on display function. To further improve an intelligent interaction capability between the electronic device and the user, the user may enable the intelligent mode option to trigger the mobile phone 200 to intelligently determine an always on display mode based on different scenarios, and display different screens after the screen is turned off.

Figure 4G:
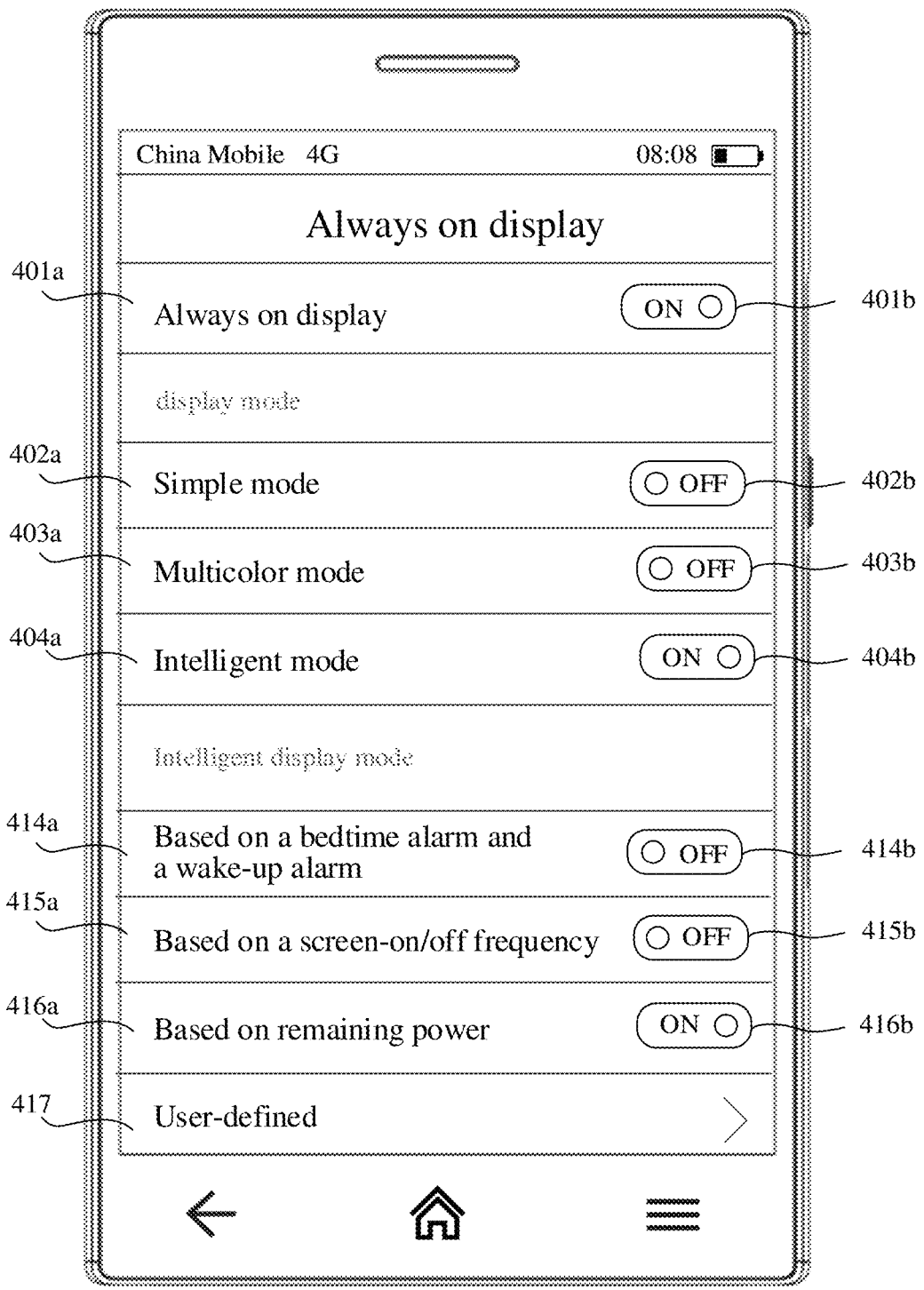
FIG. 4g is a schematic diagram of yet another possible always on display settings interface according to this application.

In some other embodiments of this application, the settings interface of the always on display function may alternatively be shown in FIG. 4*g*. The settings interface of the always on display function includes the always on display option 401*a* and the virtual button 401*b*, the simple mode option 402*a* and the virtual button 402*b*, the multicolor mode option 403*a* and the virtual button 403*b*, the intelligent mode option 404*a* and the virtual button 404*b*, an option 414*a* that is based on a specified bedtime alarm and a specified wake-up alarm, a virtual button 414*b*, an option 415*a* that is based on a screen-on/off frequency, a virtual button 415*b*, an option 416*a* that is based on remaining power, a virtual button 416*b*, and a user-defined option 417. The virtual button 401*b* is used to enable or disable the always on display function. The virtual button 402*b* is used to enable or disable the simple mode. The virtual button 403*a* is used to enable or disable the multicolor mode. The virtual button 404*b* is used to enable or disable the intelligent mode. The virtual button 414*b* is used to enable or disable an always on display mode that is intelligently determined based on the specified bedtime alarm and the specified wake-up alarm. The virtual button 415*b* is used to enable or disable an always on display mode that is intelligently determined based on the screen-on/off frequency. The virtual button 416*b* is used to enable or disable an always on display mode that is intelligently determined based on the remaining power. In the settings interface of the always on display function shown in FIG. 4*g*, the virtual button 401*b*, the virtual button 404*b*, and the virtual button 416*b* are on (ON); and the virtual button 402*b*, the virtual button 403*b*, the virtual button 414*b*, and the virtual button 415*b* are off (OFF). In a scenario of the settings interface of the always on display function shown in FIG. 4g, the mobile phone 200 intelligently determines the always on display mode from the simple mode and the multicolor mode based on current remaining power.

For example, when the mobile phone 200 detects that the remaining power is greater than 10% and less than 30%, in response to an event that the remaining power is greater than 20% and less than 50%, the mobile phone 200 determines that the always on display mode is the simple mode. If the mobile phone 200 detects that the remaining power is greater than 10% and less than 30% when the screen is on, after the screen of the mobile phone 200 is turned off, display is performed based on a display effect selected by the user in the simple mode. For example, if the display effect selected by the user in the simple mode is the display effect 400 shown in FIG. 4d, after the screen of the mobile phone 200 is turned off, the displayed always on display interface is shown in FIG. 1a. If the mobile phone 200 detects that the remaining power is greater than 10% and less than 30% when the screen is off, display is performed based on the display effect selected by the user in the simple mode.

For another example, when detecting that the remaining power is less than 10%, the mobile phone 200 disables always on display in response to the event that the remaining power is less than 10%.

For another example, when detecting that the remaining power is greater than 30%, the mobile phone 200 determines, in response to the event that the remaining power is greater than 30%, that the always on display mode is the multicolor mode. If the mobile phone 200 detects that the remaining power is greater than 30% when the screen is on, after the screen of the mobile phone 200 is turned off, display is performed based on a display effect selected by the user in multicolor mode. For example, if the always on display effect selected by the user in multicolor mode is the always on display effect 413 shown in FIG. 4d, after the screen of the mobile phone 200 is turned off, the displayed always on display interface is shown in FIG. 1b. If the mobile phone 200 detects that the remaining power is greater than 30% when the screen is off, display is performed based on the display effect selected by the user in multicolor mode.

In addition, in this embodiment of this application, the mobile phone 200 may be triggered by an event to detect the remaining power, or may periodically detect the remaining power. For example, the mobile phone 200 is triggered to detect the remaining power when detecting an event of switching from a screen-on state to a screen-off state; or the mobile phone 200 is triggered to detect the remaining power when detecting an event of switching from the screen-off state to the screen-on state; or the mobile phone 200 is triggered to detect the remaining power when detecting that a video call is connected. The event for triggering detection of the remaining power is not limited in this embodiment of this application.

It should be understood that the mobile phone 200 may detect the remaining power by using the processor 201 or a specific chip (for example, an artificial intelligence (artificial intelligence, AI) chip). This is not limited in this embodiment of this application.

It should further be understood that, in this embodiment of this application, the mobile phone 200 may switch from the screen-on state to the screen-off state when detecting a lock screen input of the user. For example, the lock screen input of the user may be an operation of pressing a power key by the user, tapping or double-tapping an icon of "lock the screen" displayed on the display panel by the user, a gesture of locking the screen by the user (for example, sliding up with three fingers), or the like. This is not limited. In addition, the mobile phone 200 may alternatively switch from the screen-on state to the screen-off state when no input operation is detected within specified duration. The specified duration may be duration that is set by the user based on a requirement. For example, the specified duration may be 10 seconds, 20 seconds, 30 seconds, or 2 minutes.

It should further be understood that the foregoing are merely examples for description, and does not constitute a limitation on this embodiment of this application. In this embodiment of this application, a specific range of the remaining power within which the mobile phone 200 determines that the always on display mode is the simple mode, or a specific range of the remaining power within which the mobile phone 200 determines that the always on display mode is the multicolor mode, or a specific range of the remaining power within which the mobile phone 200 disables the always on display, may be correspondingly adjusted based on a requirement of the user. This is not limited herein.

Figure 4H:
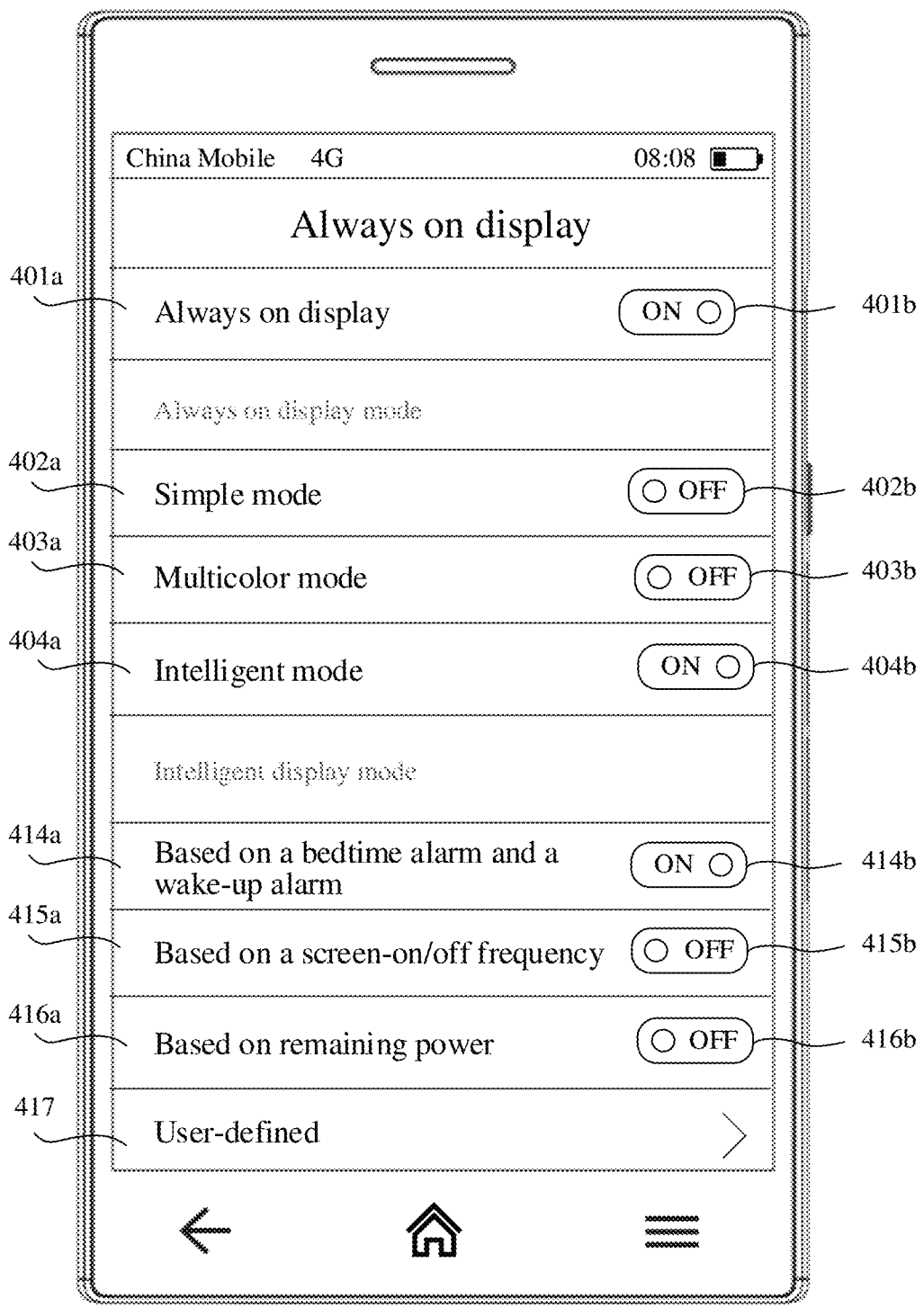
FIG. 4h is a schematic diagram of yet another possible always on display settings interface according to this application.

In some other embodiments of this application, the settings interface of the always on display function may alternatively be shown in FIG. 4h. The settings interface of the always on display function includes the always on display option 401a and the virtual button 401b, the simple mode option 402a and the virtual button 402b, the multicolor mode option 403a and the virtual button 403b, the intelligent mode option 404a and the virtual button 404b, the option 414a that is based on the specified bedtime alarm and the specified wake-up alarm, the virtual button 414b, the option 415a that is based on the screen-on/off frequency, the virtual button 415b, the option 416a that is based on the remaining power, the virtual button 416b, and the user-defined option 417. The virtual button 401b is used to enable or disable the always on display function. The virtual button 402b is used to enable or disable the simple mode. The virtual button 403a is used to enable or disable the multicolor mode. The virtual button 404b is used to enable or disable the intelligent mode. The virtual button 414b is used to enable or disable the always on display mode that is intelligently determined based on the specified bedtime alarm and the specified wake-up alarm. The virtual button 415b is used to enable or disable the always on display mode that is intelligently determined based on the screen-on/off frequency. The virtual button 416b is used to enable or disable the always on display mode that is intelligently determined based on the remaining power. In the settings interface of the always on display function shown in FIG. 4h, the virtual button 401b, the virtual button 404b, and the virtual button 414b are on (ON); and the virtual button 402b, the virtual button 403b, the virtual button 415b, and the virtual button 416b are off (OFF). In a scenario of the settings interface of the always on display function shown in FIG. 4h, the mobile phone 200 intelligently determines the always on display mode from the simple mode and the multicolor mode based on the specified bedtime alarm and the specified wake-up alarm.

For example, a bedtime alarm set by the user on the mobile phone 200 is 23:00, and a wake-up alarm is 6:00. When detecting that a current moment reaches 23:00, the mobile phone 200 determines, in response to the event that the current moment reaches 23:00, that the always on display mode is the simple mode. If the mobile phone 200 detects that the current moment reaches 23:00 when the screen is on, after the screen of the mobile phone 200 is turned off, display is performed based on the display effect selected by the user in the simple mode. For example, if the display effect selected by the user in the simple mode is the display effect 400 shown in FIG. 4*d*, after the screen of the mobile phone 200 is turned off, the displayed always on display interface is shown in FIG. 1*a*. If the mobile phone 200 detects that the current moment reaches 23:00 when the screen is off, display is performed based on the display effect selected by the user in the simple mode.

For another example, when detecting that the current moment reaches 6:00, the mobile phone 200 determines, in response to the event that the current moment reaches 6:00, that the always on display mode is the multicolor mode. If the mobile phone 200 detects that the current moment reaches 6:00 when the screen is on, after the screen of the mobile phone 200 is turned off, display is performed based on the display effect selected by the user in multicolor mode. For example, if the display effect selected by the user in multicolor mode is the always on display effect 413 shown in FIG. 4*f*, after the screen of the mobile phone 200 is turned off, the displayed always on display interface is shown in FIG. 1*b*. If the mobile phone 200 detects that the current moment reaches 6:00 when the screen is off, display is performed based on the display effect selected by the user in multicolor mode.

It should be understood that, the mobile phone 200 may detect whether the current moment reaches the bedtime alarm or the wake-up alarm by using the processor 201 or the specific chip (for example, the AI chip). This is not limited in this embodiment of this application.

It should be understood that, in this embodiment of this application, for a manner in which the mobile phone 200 switches from the screen-on state to the screen-off state, refer to implementations in the foregoing examples. Details are not described herein again.

It should further be understood that the foregoing are merely examples for description, and does not constitute a limitation on this embodiment of this application. This embodiment of this application may be further applied to a scenario in which the user sets a plurality of bedtime alarms and a plurality of wake-up alarms on the mobile phone 200. In addition, when the mobile phone 200 detects that the current moment reaches a moment of the bedtime alarm, the mobile phone 200 may further disable the always on display in response to that the current moment reaches the moment of the bedtime alarm. In addition, it should further be noted that, when the settings interface of the always on display function is shown in FIG. 4*h*, regardless of whether the mobile phone 200 intelligently determines that the always on display mode is the simple mode or the multicolor mode, when detecting that the remaining power is less than a threshold (for example, 10%; and a specific value of the threshold may be correspondingly set by the user based on an actual requirement), the mobile phone 200 disables the always on display.

If the mobile phone 200 detects that the remaining power is less than the threshold when the settings interface of the always on display function is the screen shown in FIG. 4*h*, the mobile phone 200 disables the always on display. In the foregoing case, in some embodiments, when the mobile phone 200 detects that the remaining power is greater than the threshold, the mobile phone 200 re-enables the always on display. After the mobile phone 200 re-enables the always on display function, the settings interface of the always on display function is still the screen shown in FIG. 4*h*, or may be an initial settings interface of the always on display function. This is not limited.

Figure 4I:
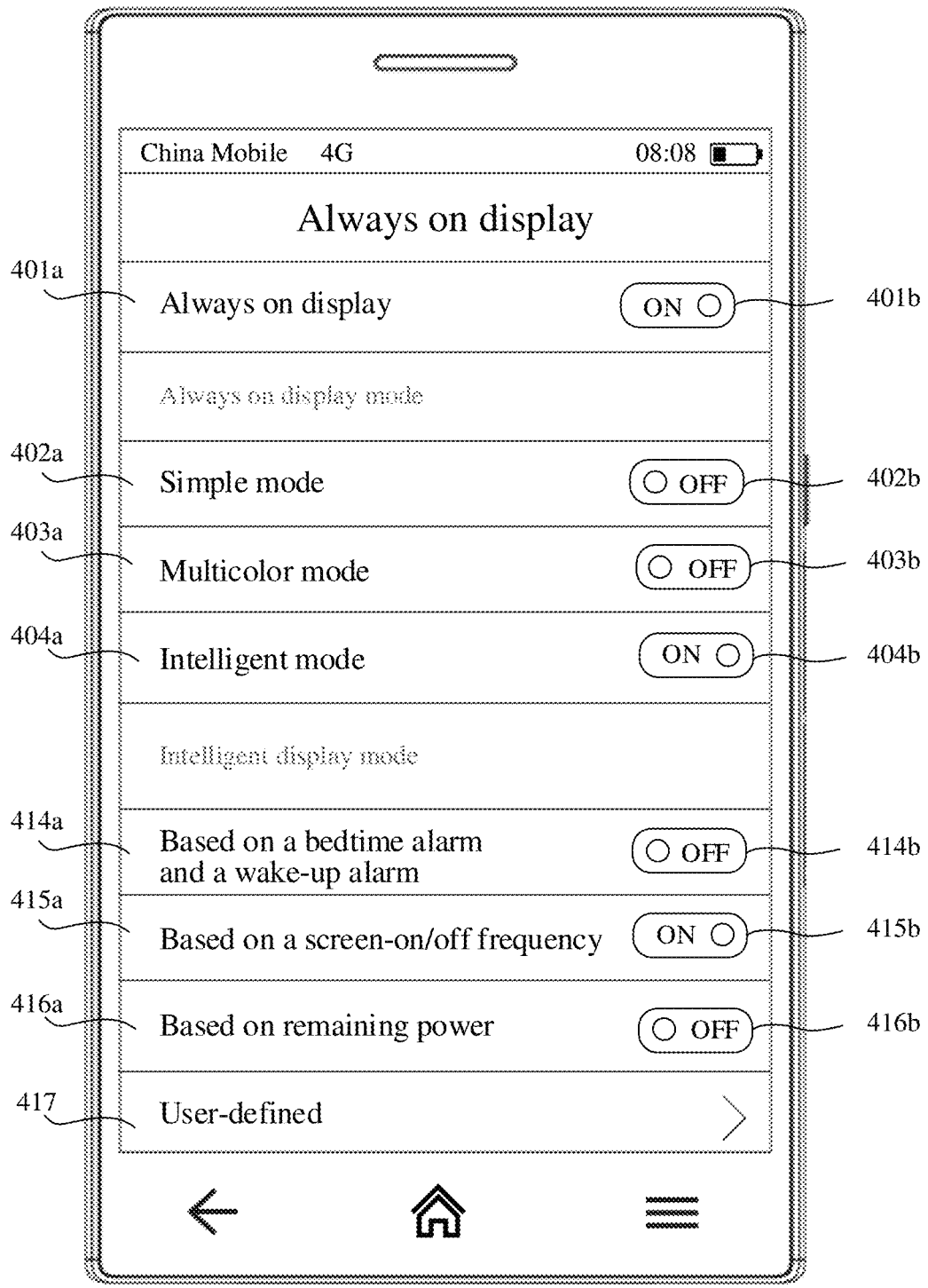
FIG. 4i is a schematic diagram of yet another possible always on display settings interface according to this application.

In some other embodiments of this application, the settings interface of the always on display function may be further shown in FIG. 4*i*. The settings interface of the always on display function includes the always on display option 401*a* and the virtual button 401*b*, the simple mode option 402*a* and the virtual button 402*b*, the multicolor mode option 403*a* and the virtual button 403*b*, the intelligent mode option 404*a* and the virtual button 404*b*, the option 414*a* that is based on the specified bedtime alarm and the specified wake-up alarm, the virtual button 414*b*, the option 415*a* that is based on the screen-on/off frequency, the virtual button 415*b*, the option 416*a* that is based on the remaining power, the virtual button 416*b*, and the user-defined option 417. The virtual button 401*b* is used to enable or disable the always on display function. The virtual button 402*b* is used to enable or disable the simple mode. The virtual button 403*a* is used to enable or disable the multicolor mode. The virtual button 404*b* is used to enable or disable the intelligent mode. The virtual button 414*b* is used to enable or disable the always on display mode that is intelligently determined based on the specified bedtime alarm and the specified wake-up alarm. The virtual button 415*b* is used to enable or disable the always on display mode that is intelligently determined based on the screen-on/off frequency. The virtual button 416*b* is used to enable or disable the always on display mode that is intelligently determined based on the remaining power. In the settings interface of the always on display function shown in FIG. 4*i*, the virtual button 401*b*, the virtual button 404*b*, and the virtual button 415*b* are on (ON); and the virtual button 402*b*, the virtual button 403*b*, the virtual button 414*b*, and the virtual button 416*b* are off (OFF). In a scenario of the settings interface of the always on display function shown in FIG. 4*i*, the mobile phone 200 intelligently determines a current always on display mode from the simple mode and the multicolor mode based on the screen-on/off frequency.

For example, the mobile phone 200 may periodically detect the screen-on/off frequency, or may be triggered by an event to detect the screen-on/off frequency. Detecting the screen-on/off frequency triggered by an event may be: When detecting that the current moment reaches the wake-up alarm, the mobile phone 200 detects a screen-on/off frequency in first duration starting from a moment of the wake-up alarm, and when the screen-on/off frequency in the first duration is in a first range, in response to the event that the screen-on/off frequency in the first duration is in the first range, the mobile phone 200 determines that the always on display mode is the simple mode. If the screen-on/off frequency in the first duration is in a second range, in response to the event that the screen-on/off frequency in the first duration is in the second range, the mobile phone 200 determines that the always on display mode is the multicolor mode. In addition, the detecting the screen-on/off frequency triggered by an event may further be: When detecting that the current moment reaches the bedtime alarm, the mobile phone 200 detects a screen-on/off frequency in second duration starting from a moment of the bedtime alarm, and when the screen-on/off frequency in the second duration is in a third range, in response to the event that the screen-on/off frequency in the second duration is in the third range, the mobile phone 200 determines that the always on display mode is the simple mode. If the screen-on/off frequency in the second duration is in a fourth range, in response to the event that the screen-on/off frequency in the second duration is in the fourth range, the mobile phone 200 determines that the always on display mode is the multicolor mode. In addition, it should be noted that in this embodiment of this application, the event for triggering detection of the screen-on/off frequency may alternatively be another event, for example, a power-on event. The foregoing are merely examples for description. This is not limited in this embodiment of this application.

When the detection of the screen-on/off frequency is triggered by different events, time ranges in which the mobile phone 200 counts the screen-on/off frequency may be the same or may be different. When the detection of the screen-on/off frequency is triggered by the different events, in specific implementation, a specific range of the screen-on/off frequency within which the mobile phone 200 determines that the always on display mode is the simple mode, or a specific range of the screen-on/off frequency within which the mobile phone 200 determines that the always on display mode is the multicolor mode, may be corresponding set based on a requirement of the user. This is not limited herein.

An example in which the screen-on/off frequency is periodically detected is used as an example. If the mobile phone 200 detects that the screen-on/off frequency is in the first range when the screen is on, after the screen of the mobile phone 200 is turned off, display is performed based on the display effect selected by the user in the simple mode. If the mobile phone 200 detects that the screen-on/off frequency is in the first range when the screen is off, display is performed based on the display effect selected by the user in the simple mode. For example, if the display effect selected by the user in the simple mode is the display effect 400 shown in FIG. 4d, after the screen of the mobile phone 200 is turned off, the displayed always on display interface is shown in FIG. 1a. For example, that the screen-on/off frequency is in the first range may be that the screen-on/off frequency is less than a specified threshold, or the screen-on/off frequency is in be a threshold range set that is preset by the mobile phone 200, for example, {K|0≤K≤10}. It should be understood that, the threshold range set may include a plurality of consecutive positive integers, or may include a plurality of inconsecutive positive integers. This is not limited. In specific implementation, the threshold and the threshold range set may be correspondingly set based on a requirement of the user. This is not limited herein.

For another example, if the mobile phone 200 detects that the screen-on/off frequency is in the second range when the screen is on, after the screen of the mobile phone 200 is turned off, display is performed based on the display effect selected by the user in multicolor mode. If the mobile phone 200 detects that the screen-on/off frequency is in the second range when the screen is off, display is performed based on the display effect selected by the user in multicolor mode. For example, if the display effect selected by the user in multicolor mode is the always on display effect 413 shown in FIG. 4f, after the screen of the mobile phone 200 is turned off, the displayed always on display interface is shown in FIG. 1b. A specific implementation of the second range is similar to a specific implementation of the first range, and details are not described herein again.

It should be understood that the mobile phone 200 may detect the screen-on/off frequency by using the processor 201 or the specific chip (for example, the AI chip). This is not limited in this embodiment of this application.

It should be understood that, in this embodiment of this application, for a manner in which the mobile phone 200 switches from the screen-on state to the screen-off state, refer to implementations in the foregoing examples. Details are not described herein again.

It should further be understood that the foregoing are merely examples for description, and does not constitute a limitation on this embodiment of this application. In addition, if the mobile phone 200 enables the always on display function, when the mobile phone 200 detects that the screen-on/off frequency is 0, the mobile phone 200 may further disable the always on display in response to that the screen-on/off frequency is 0. In addition, it should further be noted that, when the settings interface of the always on display function is shown in FIG. 4i, regardless of whether the current always on display mode of the mobile phone 200 is the simple mode or the multicolor mode, when detecting that the screen-on/off frequency is 0, the mobile phone 200 disables the always on display.

If the mobile phone 200 detects that the screen-on/off frequency is 0 when the settings interface of the always on display function is the screen shown in FIG. 4i, the mobile phone 200 disables the always on display. In this case, in some embodiments, when the mobile phone 200 detects that the screen-on/off frequency is not 0, the mobile phone 200 re-enables the always on display. After the mobile phone 200 re-enables the always on display, the settings interface of the always on display function is still the screen shown in FIG. 4i, or may be the initial settings interface of the always on display function. This is not limited.

Figure 4J:
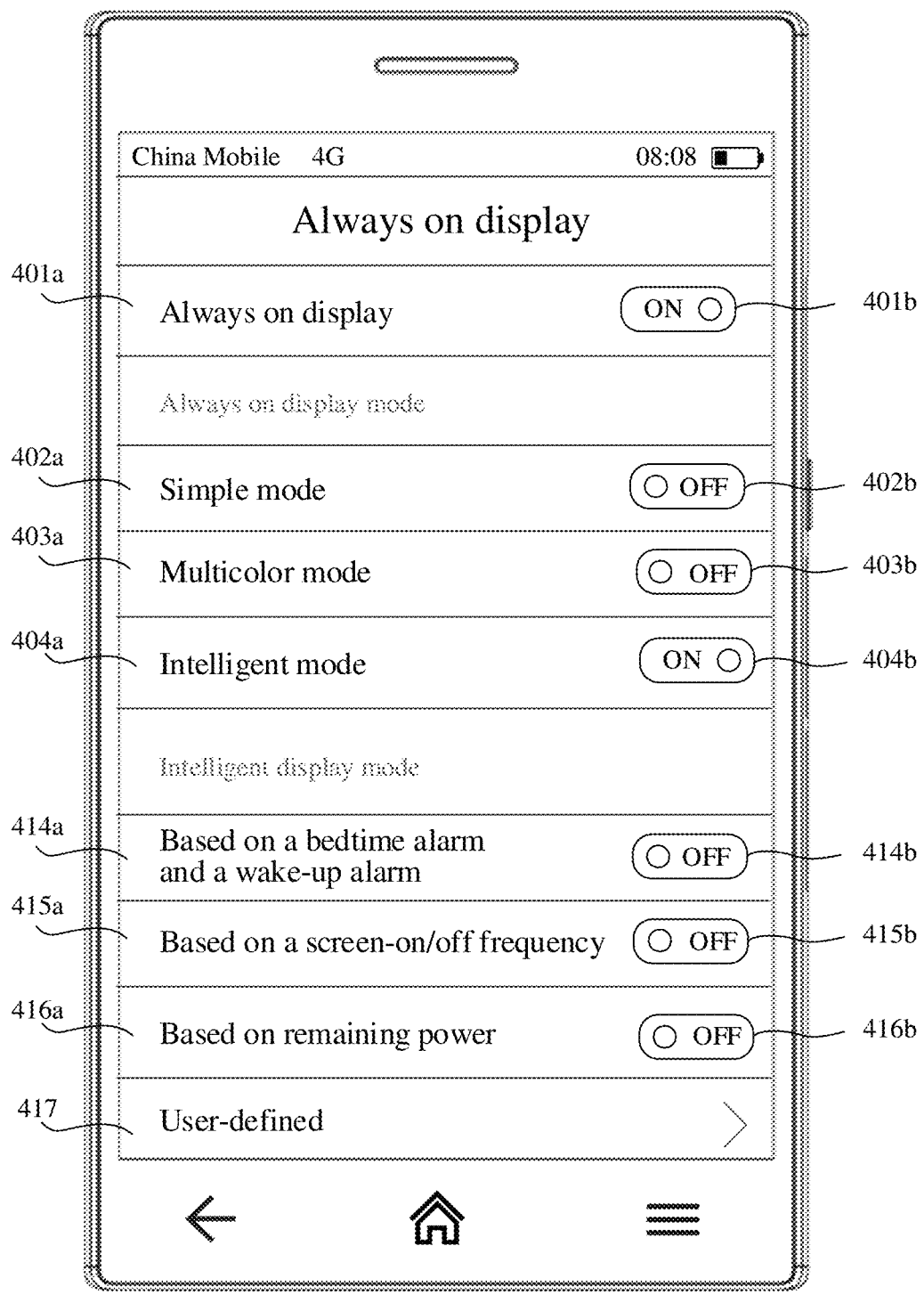
FIG. 4j is a schematic diagram of yet another possible always on display settings interface according to this application.

In addition, the settings interface of the always on display function may alternatively be shown in FIG. 4j. The settings interface of the always on display function includes the always on display option 401a and the virtual button 401b, the simple mode option 402a and the virtual button 402b, the multicolor mode option 403a and the virtual button 403b, the intelligent mode option 404a and the virtual button 404b, the option 414a that is based on the specified bedtime alarm and the specified wake-up alarm, the virtual button 414b, the option 415a that is based on the screen-on/off frequency, the virtual button 415b, the option 416a that is based on the remaining power, the virtual button 416b, and the user-defined option 417. The virtual button 401b is used to enable or disable the always on display function. The virtual button 402b is used to enable or disable the simple mode. The virtual button 403a is used to enable or disable the multicolor mode. The virtual button 404b is used to enable or disable the intelligent mode. The virtual button 414b is used to enable or disable the always on display mode that is intelligently determined based on the specified bedtime alarm and the specified wake-up alarm. The virtual button 415b is used to enable or disable the always on display mode that is intelligently determined based on the screen-on/off frequency. The virtual button 416b is used to enable or disable the always on display mode that is intelligently determined based on the remaining power. The virtual button 401b and the virtual button 404b are on (ON). The virtual button 402b, the virtual button 403b, the virtual button 414b, the virtual button 415b, and the virtual button 416b are off (OFF). In a scenario of the settings interface of the always on display function shown in FIG. 4j, for example, the mobile phone 200 may intelligently determine the always on display mode from the simple mode and the multicolor mode based on a user-defined setting.

Figure 4K:
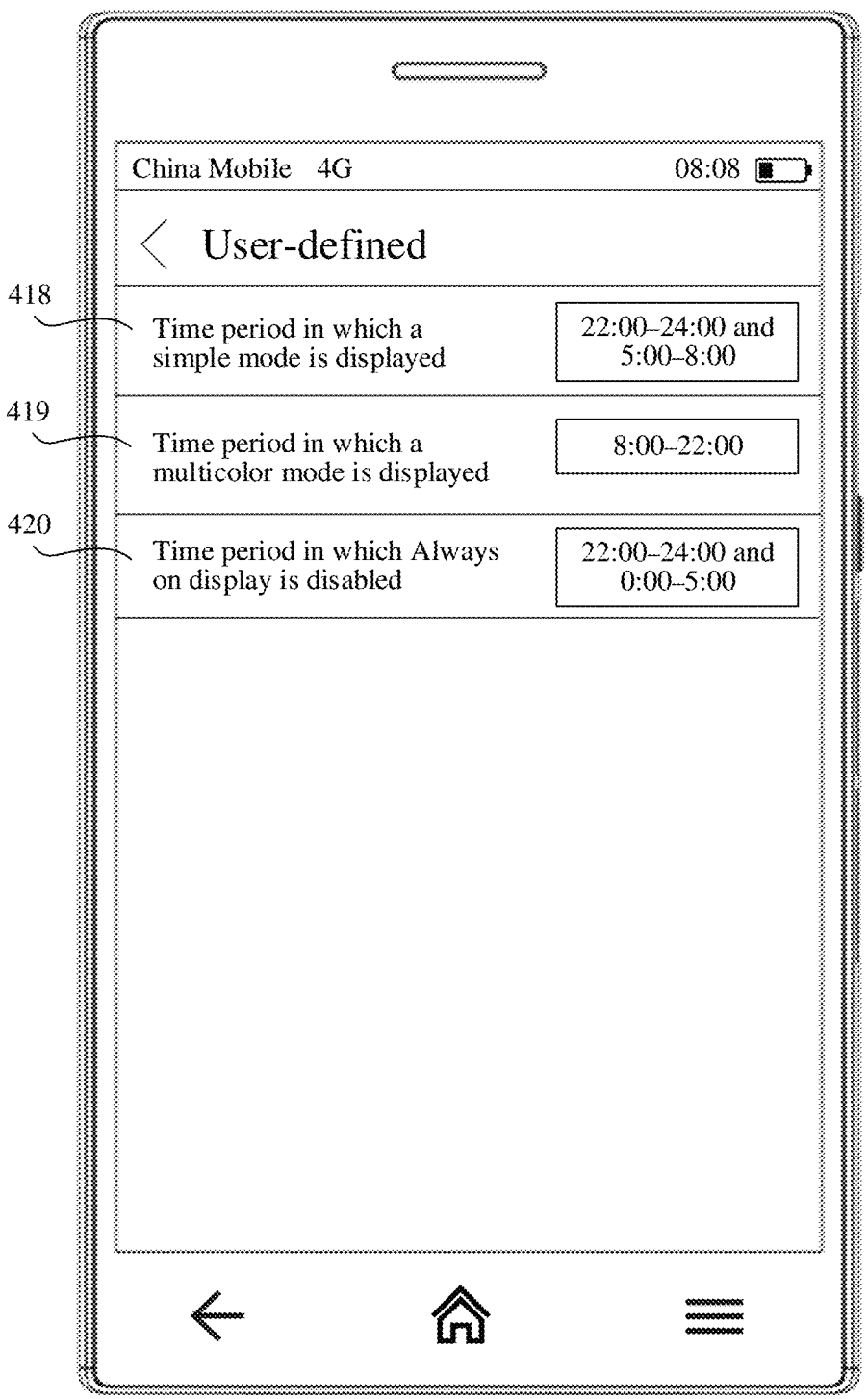
FIG. 4k is a schematic diagram of a possible user-defined settings interface according to this application.

For example, the user-defined setting is shown in FIG. 4k. When current time is in a time period corresponding to a time period option 418 of which the simple mode is displayed, for example, when the current time is 7:00, because 7:00 is in a range from 5:00 to 8:00, the mobile phone 200 intelligently determines that the always on display mode is the simple mode. For another example, when the current time is 23:00, because 23:00 is in a range from 22:00 to 24:00, the mobile phone 200 intelligently determines that the always on display mode is the simple mode. Similarly, when the current time is in a time period corresponding to a time period option 419 of which the multicolor mode is displayed, the mobile phone 200 intelligently determines that the always on display mode is the multicolor mode. When the current time is in a time period corresponding to a time period option 420 of which the always on display is disabled, the mobile phone 200 disables the always on display mode.

It should further be understood that the foregoing are merely examples for description, and does not constitute a limitation on this embodiment of this application. The user-defined setting may be another manner, and this is not limited. For example, when the mobile phone enables an application (such as Tencent Video or a personal hotspot) with relatively high power consumption, the mobile phone 200 matches the simple mode or disables the always on display function.

In addition, it should further be noted that, when the settings interface of the always on display function is shown in FIG. 4*j* and a user-defined control screen is shown in FIG. 4*k*, for example, between 5:00-22:00, when detecting that the remaining power is lower than a threshold (for example, 10%, and in specific implementation, the threshold may be correspondingly set by the user based on an actual requirement), the mobile phone 200 disables the always on display.

Figure 5:
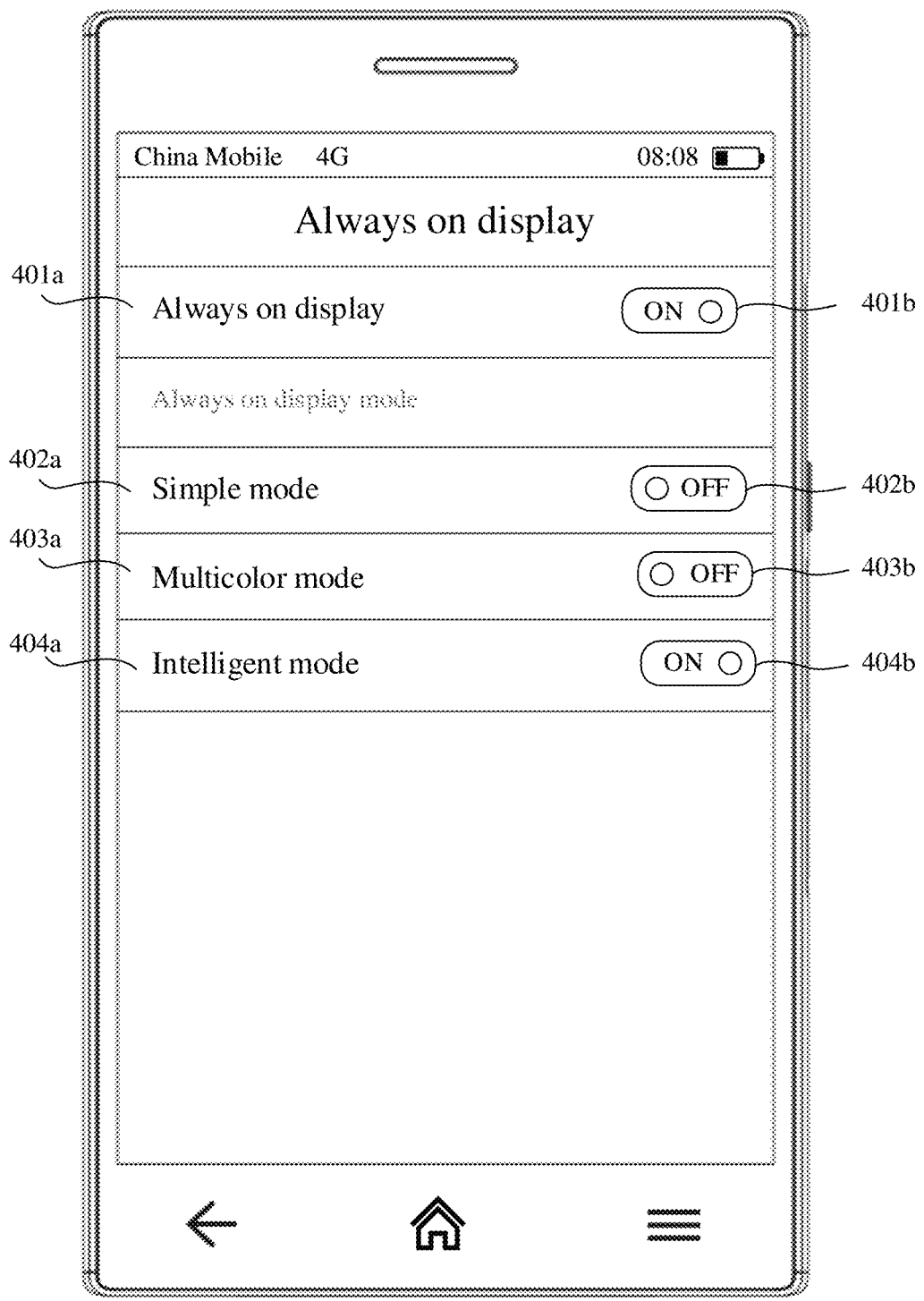
FIG. 5 is a schematic diagram of yet another possible always on display settings interface according to this application.

In addition, in some embodiments, when the always on display function and the intelligent mode are enabled, the settings interface of the always on display function may be shown in FIG. 5. The settings interface of the always on display function shown in FIG. 5 may include the always on display option 401*a* and the virtual button 401*b*, the simple mode option 402*a* and the virtual button 402*b*, the multicolor mode option 403*a* and the virtual button 403*b*, the intelligent mode 404*a* and the virtual button 404*b*. The virtual button 401*b* is used to enable or disable the always on display function. The virtual button 402*b* is used to enable or disable the simple mode. The virtual button 403*a* is used to enable or disable the multicolor mode. The virtual button 404*b* is used to enable or disable the intelligent mode. The virtual button 402*b* and 403*b* are off, and the virtual button 401*b* and 404*b* are on.

When the settings interface of the always on display function is shown in FIG. 5, the mobile phone 200 intelligently determines the always on display mode. Specifically, how the mobile phone 200 intelligently determines the always on display mode is related to an algorithm configured on the mobile phone 200. For example, if the mobile phone 200 is configured to intelligently determine the always on display mode based on the bedtime alarm and the wake-up alarm, when the virtual buttons 401*b* and 404*b* are turned on, the mobile phone 200 intelligently determines the always on display mode based on the bedtime alarm and the wake-up alarm. In addition, an algorithm for intelligently determining the always on display mode based on the screen-on/off frequency, an algorithm for intelligently determining the always on display mode based on the remaining power, or the like may alternatively be configured on the mobile phone 200. This is not limited. For details about how the mobile phone 200 intelligently determines the always on display mode, refer to the descriptions in the foregoing examples. Details are not described herein again.

In addition, in this application, only one always on display option and one virtual button that is used to enable or disable the always on display function may alternatively be set in the system settings interface. In this scenario, when detecting that the virtual button is on, the mobile phone 200 intelligently determines the always on display mode. Specifically, how the mobile phone 200 intelligently determines the always on display mode is related to the algorithm configured on the mobile phone 200. For example, if the algorithm for intelligently determining the always on display mode based on the screen-on/off frequency is configured on the mobile phone 200, when the virtual button is on, the mobile phone 200 intelligently determines the always on display mode based on the screen-on/off frequency. In addition, the algorithm for intelligently determining the always on display mode based on the bedtime alarm and the wake-up alarm, the algorithm for intelligently determining the always on display mode based on the remaining power, or the like may alternatively be configured on the mobile phone 200. This is not limited. For details about how the mobile phone 200 intelligently determines the always on display mode, refer to the descriptions in the foregoing examples. Details are not described herein again.

In the foregoing embodiments, when the always on display function is enabled, after the screen of the mobile phone 200 is turned off, the mobile phone 200 may display the clock and the date, and may further display a power consumption prompt, an incoming call notification, an information notification, an icon for quickly opening a preset application, information pushed to the user according to a preset rule, or the like. This is not limited. In specific implementation, for example, the user may perform corresponding setting by touching a to-be-displayed content option and a notification display option on the layout settings interface.

With reference to the foregoing embodiments and the accompanying drawings, an embodiment of this application provides an always on display method. The method may be implemented on an electronic device having the hardware structure shown in FIG. 2*a*. For example, a touchscreen of the electronic device may be an OLED screen.

Figure 7A:
FIG. 7a is a schematic diagram of a possible always on display interface according to this application.
Figure 7B:
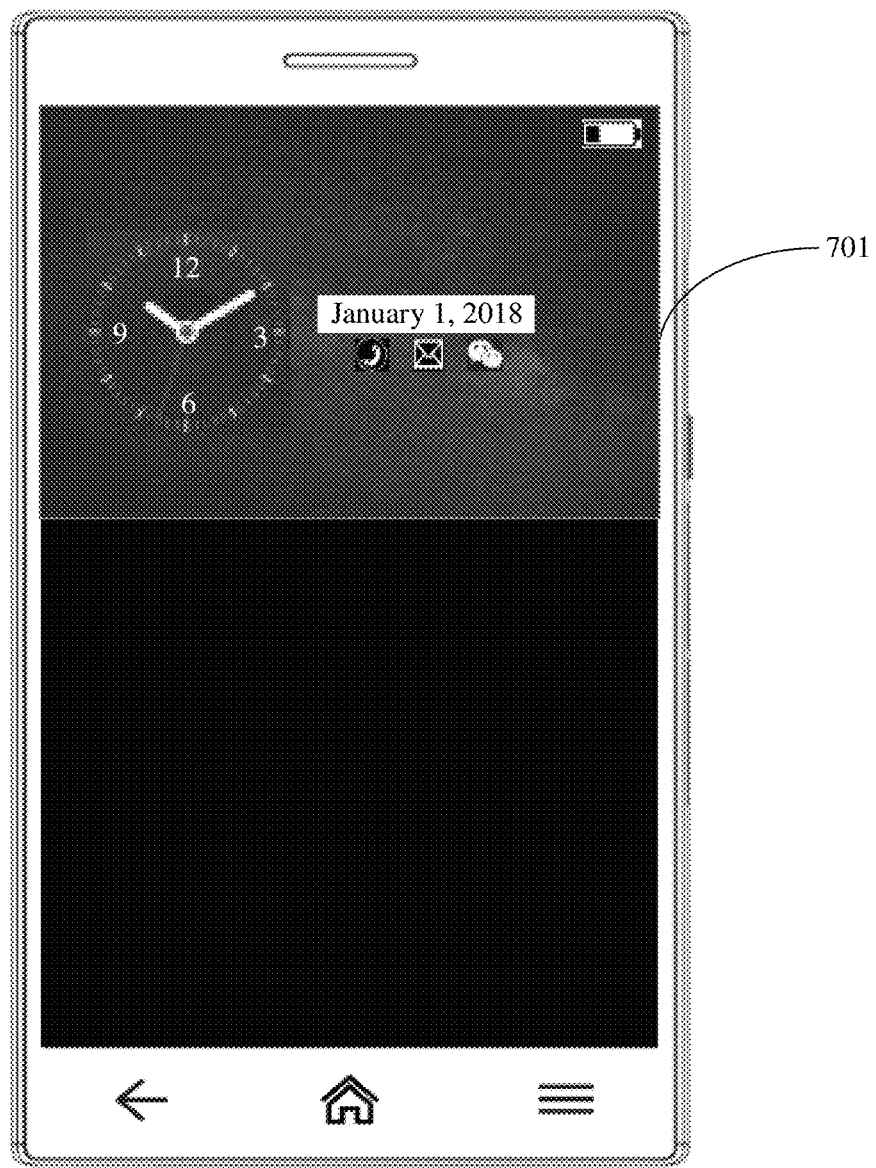
FIG. 7b is a schematic diagram of another possible always on display interface according to this application.

An example in which an always on display mode configured on the electronic device includes a first mode and a second mode is used. After the screen is turned off, power consumption of the electronic device displaying in the first mode is lower than power consumption of the electronic device displaying in the second mode. An always on display interface corresponding to the first mode is different from an always on display interface corresponding to the second mode. For example, the always on display interface corresponding to the first mode does not include a background wallpaper, but includes at least one of a clock, a date, remaining power, a missed call, and unread SMS message information. For example, the always on display interface corresponding to the first mode is shown in FIG. 7*a*, and includes the clock, the date, the missed call, and the remaining power. For example, the always on display interface corresponding to the second mode includes at least one of the clock, the date, the remaining power, the missed call, the unread SMS message information, the background wallpaper, and an application icon. The application icon may be an icon of a basic application such as Phone or Messages, or may be an icon of a third-party application such as WeChat or Alipay. This is not limited. For example, the always on display interface corresponding to the second mode is shown in FIG. 7*b*, and includes a background wallpaper, a clock, a date, a phone icon, an email icon, a WeChat icon, and remaining power that are in an area 701. In some embodiments, a quantity of colors included on the always on display interface corresponding to the first mode is less than a quantity of colors included on the always on display interface corresponding to the second mode. For example, the always on display interface corresponding to the first mode includes eight colors, and the always on display interface corresponding to the second mode includes 16.7 mega colors. For example, the always on display interface corresponding to the first mode includes eight colors: black (0, 0, 0), blue (0, 0, 255), green (0, 255, 0), cyan (0, 255, 255), red (255, 0, 0), magenta (255, 0, 255), yellow (255, 255). 255, 0), and white (255, 255, 255).

Figure 6:
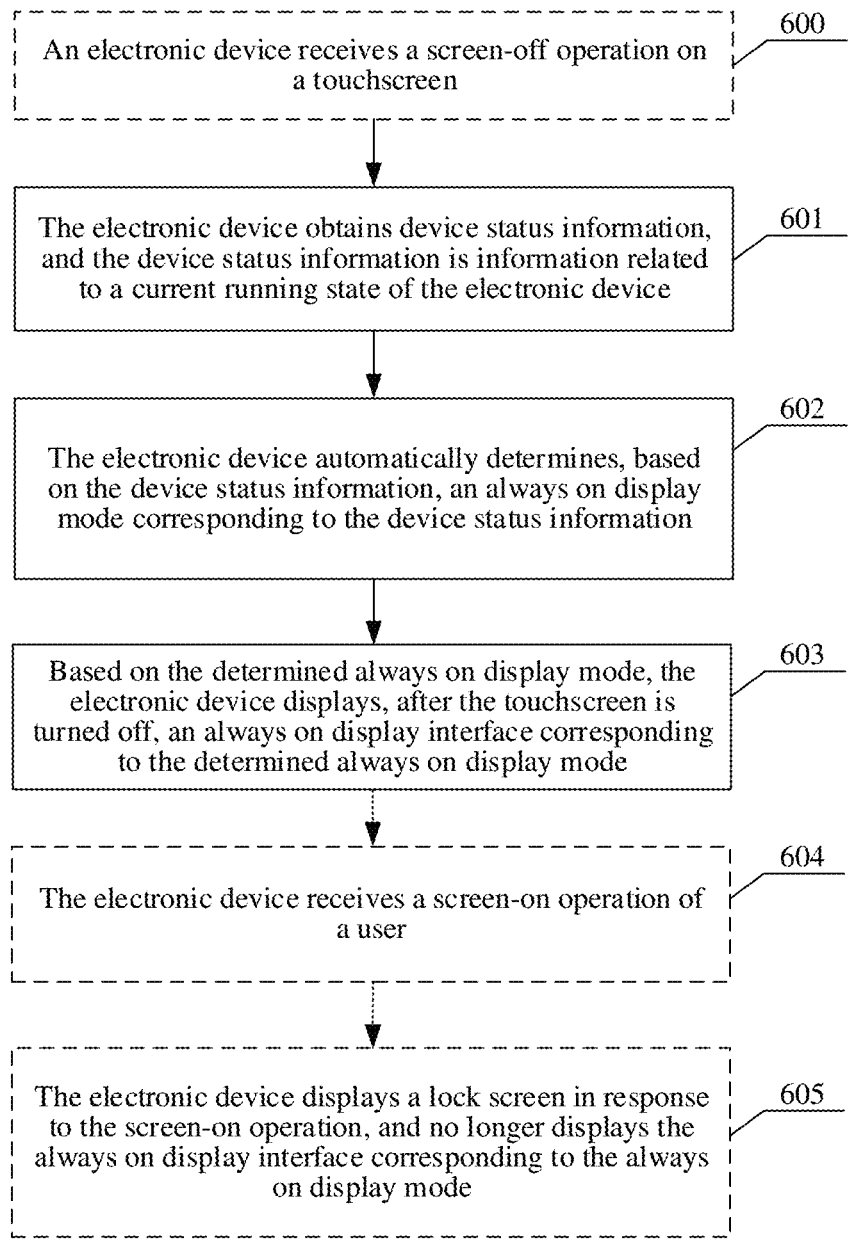
FIG. 6 is a schematic flowchart of an always on display method according to this application.

Specifically, as shown in FIG. 6, the always on display method according this embodiment of this application may include the following steps.

Step 600: The electronic device receives a screen-off operation on the touchscreen, and the screen-off operation may be specifically an operation of pressing a power key by a user, or an operation of tapping, by the user, a virtual button that is used to turn off the screen and that is on the touchscreen, or may be a predefined gesture operation (for example, sliding up with four fingers or sliding up with three fingers) used to turn off the screen, or may be a heavy press or press-and-hold operation performed on a specific control on the touchscreen by a finger of the user.

Step 601: The electronic device obtains device status information, and the device status information is information related to a current running state of the electronic device. The device status information may be considered as a set of data, and the set includes various types of data collected by the electronic device. For example, the device status information may include external environment data collected by the electronic device by using various configured sensors. For example, the electronic device may obtain ambient light intensity by using the ambient light sensor in FIG. 2a, or may detect a value and a direction of gravity of the electronic device by using an accelerometer sensor, or may detect current ambient temperature and humidity by using a temperature sensor. The electronic device may further detect a quantity of walking steps of the user by using a pedometer, and may further detect a heart rate of the user by using a heart rate sensor. For another example, the device status information may include geographical location information obtained by the electronic device by using the positioning apparatus 208 in FIG. 2a. For another example, the device status information may further include an alarm set by the user on the electronic device, or a counted screen-on/off frequency of the electronic device. Alternatively, the device status information may include the remaining power of the electronic device. For another example, the device status information may further include specific configuration information that is obtained by the electronic device and that is set by the user on an always on display control screen, as shown in FIG. 4a to FIG. 4k. FIG. 4a is used as an example. The configuration information included in the device status information indicates that the always on display function is disabled. FIG. 4c is used as an example. The configuration information included in the device status information indicates that the always on display function and the simple mode are enabled, and the multicolor mode and the intelligent mode are disabled.

Step 602: The electronic device automatically determines, from the first mode and the second mode based on the device status information, an always on display mode corresponding to the device status information.

In this step, the electronic device may analyze the collected device status information, and then automatically determine, based on an analysis result, the always on display mode corresponding to the device status information. It should be understood that the electronic device may analyze the device status information by using an AI chip or a processor, to obtain the analysis result.

The following uses an example in which the first mode is the simple mode and the second mode is the multicolor mode for description.

For example, the device status information obtained by the electronic device may include the configuration information, time, the quantity of walking steps, the geographical location, the screen-on/off frequency, a running application, and the like. The configuration information indicates that the always on display function and the intelligent mode are enabled. The electronic device analyzes the device status information. For example, when the acceleration sensor on the electronic device detects that the quantity of walking steps of the user continuously accumulates, it is determined that the user is currently walking; when the clock on the electronic device is 18:00, it is determined that currently time is non-working time of the user; when the geographical location positioned by the electronic device is a location in a company-to-home route, it is determined that the user is currently on a way home from work. When detecting that the screen-on/off frequency is less than a preset threshold (for example, 5) and that no application is currently running in the foreground, the electronic device determines that the user currently does not use the electronic device. In this case, a result of analyzing the device status information by the electronic device is that the user currently walks on the way home from work and does not use the electronic device. In this scenario, to improve user experience of viewing information such as the time and a notification when the screen is off, the electronic device may determine that always on display mode is the multicolor mode.

For another example, the device status information obtained by the electronic device may include the configuration information, the alarm, the remaining power, the geographical location, and the light intensity. When determining that the remaining power is less than 10%, the electronic device no longer analyzes other information, and disables the always on display function or determines that the always on display mode is the simple mode. When determining that the remaining power is higher than 10%, the electronic device analyzes the other information in the device status information. When the configuration information indicates that the always on display function and the intelligent mode are enabled, a current moment reaches a moment set for the bedtime alarm, the geographical location is home, and the light intensity is 0.2 lux (Lx), it is determined that the analysis result is that the user rests at home, and the electronic device determines that the always on display mode is the simple mode.

For another example, the device status information obtained by the electronic device may include the configuration information, a charging status, the time, the geographical location, and the quantity of walking steps. When determining that the configuration information indicates that the always on display function and the intelligent mode are enabled, the electronic device is in a charging state, the current time is 10:00, and the quantity of walking steps is 0, the electronic device determines that the user is currently working. Therefore, the electronic device determines that the always on display mode is the multicolor mode.

Step 603: Based on the determined always on display mode, the electronic device displays, after the touchscreen is turned off, an always on display interface corresponding to the determined always on display mode.

It should be understood that the always on display interface is a screen displayed on the touchscreen after the screen of the electronic device is turned off, and the screen is a presentation of the always on display mode corresponding to the screen on the touchscreen. For example, the always on display interface may be shown in FIG. 7a, or may be shown in FIG. 7b.

In this embodiment of this application, after receiving the screen-off operation, the electronic device may obtain current device status information of the electronic device, and then automatically determines the always on display mode based on the device status information. In this way, the electronic device can intelligently configure the always on display mode based on a scenario that the electronic device is currently in. This improves an intelligent interaction capability between the electronic device and the user, and also improves user experience.

For example, the device status information obtained by the electronic device includes that the remaining battery power is 10%, the ambient light intensity is 0.2Lx, and the geographical location information is a home address of the user. In this case, if the electronic device no longer analyzes the ambient light intensity and the geographic location information that are included in the device status information when battery power is lower than 20%, the electronic device may automatically determine, based on that the remaining battery power is 10%, that the always on display mode is the first mode. To be specific, in always on display mode, only a few monochromatic colors, and prompts for the clock, the date, and basic functions (such as a missed call and an unread SMS message) are displayed to reduce power consumption. For another example, if the device status information obtained by the electronic device includes that the geographical location information is a company address of the user, the quantity of walking steps is 0, and the electronic device is being charged, the electronic device may automatically determine, based on the device status information, that the always on display mode is the second mode. To be specific, in always on display mode, a displayed always on display interface includes a plurality of colors, for example, 16.7 mega colors. Specifically, in multicolor mode, the electronic device may display the clock, the date, and a simple background wallpaper, and may further display prompts of various applications (such as a missed call, an unread SMS message, an unread WeChat message, and an Alipay notification), to provide cool experience for the user.

In some embodiments of this application, the always on display interface corresponding to the first mode and the always on display interface corresponding to the second mode each include a plurality of different display effects. In this case, the electronic device determines that a display effect of the always on display interface corresponding to the always on display mode determined in step 602 is a target display effect. For example, the target display effect is a display effect selected by the user from a plurality of different display effects of the always on display interface corresponding to the always on display mode determined in step 602. For another example, the target display effect may alternatively be determined by the electronic device based on a preset algorithm.

In some embodiments of this application, a quantity of application icons displayed on the always on display interface is related to the remaining power. For example, a correspondence between the remaining power and the quantity of application icons is preset on the electronic device. For example, when the remaining power is greater than or equal to 80%, a quantity of corresponding application icons is 8. When the remaining power is less than 80% and greater than or equal to 40%, a quantity of corresponding application icons is 4. When the remaining power is less than 40%, a quantity of corresponding application icons is 2. Based on the correspondence between the remaining power and the quantity of application icons, in a possible implementation, when the remaining power of the electronic device is greater than or equal to 80%, the quantity of application icons displayed on the always on display interface is 8. For example, the eight application icons displayed on the always on display interface are icons of applications installed on the electronic device, and may be determined based on an application usage frequency of the user, or may be predefined. For example, the electronic device determines, based on the application usage frequency of the user, that top eight applications are respectively WeChat, Phone, Alipay, Taobao, Dianping, Tencent Video, Baidu Map, and Jingdong. When the remaining power is greater than or equal to 80%, icons of the top eight applications that are most frequently used are displayed on the always on display interface, such as WeChat, Phone, Alipay, Taobao, Dianping, Tencent Video, Baidu Map, and Jingdong. For another example, when the remaining power of the electronic device is less than 80% and greater than or equal to 40%, the quantity of application icons displayed on the always on display interface is 4, and icons of top four applications that are most frequently used are displayed on the always on display interface. For another example, when the remaining power of the electronic device is less than 40%, the quantity of application icons displayed on the always on display interface may be 2, and icons of top two applications that are most frequently used are displayed on the always on display interface.

In some other embodiments of this application, an application icon displayed on the always on display interface is related to the remaining power. For example, a correspondence between the remaining power and the application icon is preset on the electronic device. For example, when the remaining power is greater than or equal to 80%, corresponding application icons are WeChat, Phone, Alipay, Messages, and Email. When the remaining power is less than 80% and greater than or equal to 40%, corresponding application icons are WeChat, Phone, and Messages. When the remaining power is lower than 40%, corresponding application icons are WeChat and Phone. Based on the correspondence between the remaining power and the application icon, when the device status information obtained by the electronic device includes that the remaining power is 70%, it is determined that application icons included on the always on display interface are WeChat, Phone, and Messages.

For example, in this embodiment of this application, if the application icons included on the always on display interface are WeChat, Phone, and SMS message, in an always on process of the electronic device, if there is a notification message of WeChat, Phone, and Messages, for example, a missed call, or a new SMS message or a new WeChat message, the notification message of WeChat, Phone and Messages is displayed on the always on display interface, and a notification message of another application such as Email is not displayed.

In some other embodiments of this application, step 601 may specifically include: obtaining, by the electronic device, the device status information after the touchscreen is turned off. In this way, the electronic device can more accurately determine the always on display mode of the electronic device based on latest obtained device status information. This further improves user experience.

Specifically, after receiving the screen-off operation, the electronic device turns off the touchscreen in response to the screen-off operation, obtains the device status information after the touchscreen is turned off, automatically determines, based on the device status information, the always on display mode corresponding to the device status information, and displays on the touchscreen, the always on display interface corresponding to the always on display mode.

The foregoing technical solution helps enable the touchscreen to respond timely to the screen-off operation, and to an extent, enable the obtained device status information to be closer to an actual scenario.

In some other embodiments of this application, step 601 may specifically include: after the screen-off operation is received and before the touchscreen is turned off, obtaining, by the electronic device, the device status information.

Specifically, after receiving the screen-off operation, the electronic device obtains the device status information in response to the screen-off operation, automatically determines, based on the obtained device status information, the always on display mode corresponding to the device status information, turns off the touchscreen, and displays, on the touchscreen, the always on display interface corresponding to the always on display mode. The foregoing technical solution helps reduce user perception of a process in which the electronic device obtains and processes the device status information.

In addition, in some other embodiments of this application, the electronic device may alternatively obtain the device status information before receiving the screen-off operation on the touchscreen, and trigger, after the screen-off operation on the touchscreen is received, execution of step 603. For example, the electronic device obtains the device status information, and automatically determines the always on display mode corresponding to the device status information. After receiving the screen-off operation, the electronic device turns off the touchscreen in response to the screen-off operation, and displays, on the touchscreen, the always on display interface corresponding to the determined always on display mode. This technical solution helps respond timely to the screen-off operation.

In some other embodiments of this application, the method may further include the following steps.

Step 604: When displaying the always on display interface corresponding to the always on display mode, the electronic device receives a screen-on operation of the user. For example, the screen-on operation of the user may be an operation of pressing a power key by the user, an operation of pressing a home screen key by the user, a gesture operation used to display a lock screen, or the like.

Step 605: The electronic device displays the lock screen in response to the screen-on operation, and no longer displays the always on display interface corresponding to the always on display mode.

In some other embodiments of this application, the device status information may include an always on display mode that is set by the user on the electronic device. For example, the always on display mode that is set by the user on the electronic device includes corresponding setting performed by the user on the at least one settings interface in FIG. 4*a* to FIG. 4*k*.

In some embodiments of this application, the device status information obtained by the electronic device in step 601 may further include remaining battery power information.

For example, the electronic device may automatically determine the always on display mode based on the remaining battery power information. For details, refer to the descriptions of intelligently determining the always on display mode by the mobile phone 200 based on the current remaining battery power in the embodiments of this application. Details are not described herein again.

In some other embodiments of this application, the device status information obtained by the electronic device in step 601 may further include screen-on/off frequency information.

For example, the electronic device may automatically determine the always on display mode based on the screen-on/off frequency information. For details, refer to descriptions of intelligently determining the always on display mode by the mobile phone 200 based on the screen-on/off frequency in the embodiments of this application. Details are not described herein again.

In some other embodiments of this application, the device status information obtained by the electronic device in step 601 may further include an alarm set by the user.

For example, the electronic device may automatically determine the always on display mode based on the alarm set by the user. For details, refer to the description of intelligently determining the always on display mode by the mobile phone 200 based on the bedtime alarm and the wake-up alarm in the embodiments of this application. Details are not described herein again.

In some other embodiments of this application, the device status information obtained by the electronic device in step 601 may further include one or more pieces of information such as the geographical location information, light intensity information, the quantity of walking steps, and the heart rate of the user.

In some other embodiments of this application, the device status information obtained by the electronic device in step 601 may also include the configuration information. The configuration information is obtained by the electronic device from an always on display settings interface. The always on display settings interface includes an always on display option, a first mode option, a second mode option, an intelligent mode option, a first virtual button, a second virtual button, a third virtual button, and a fourth virtual button. The first virtual button is used to enable or disable the always on display function. The second virtual button is used to enable or disable the first mode. The third virtual button is used to enable or disable the second mode. The fourth virtual button is used to enable or disable the intelligent mode.

In addition, the electronic device may further periodically obtain the device status information.

Figure 8A:
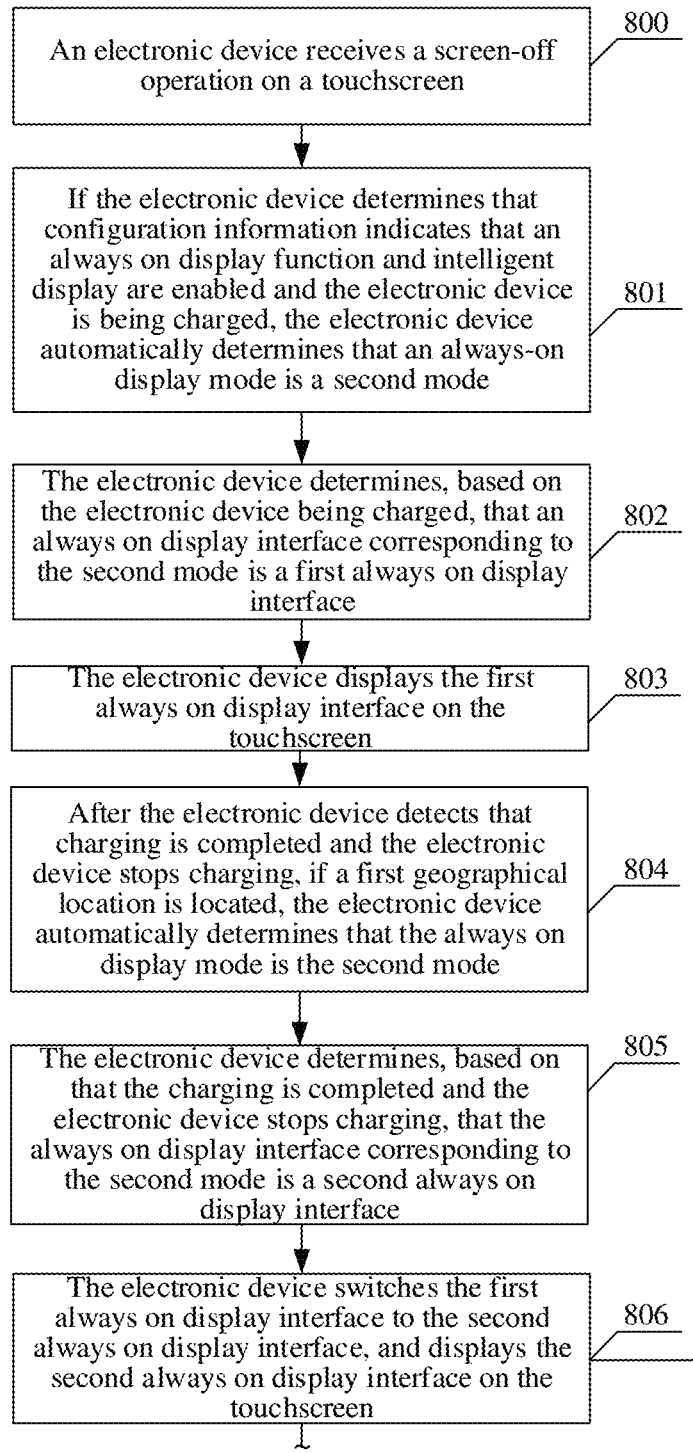
FIG. 8A and FIG. 8B are a schematic flowchart of another always on display method according to this application.
Figure 8B:
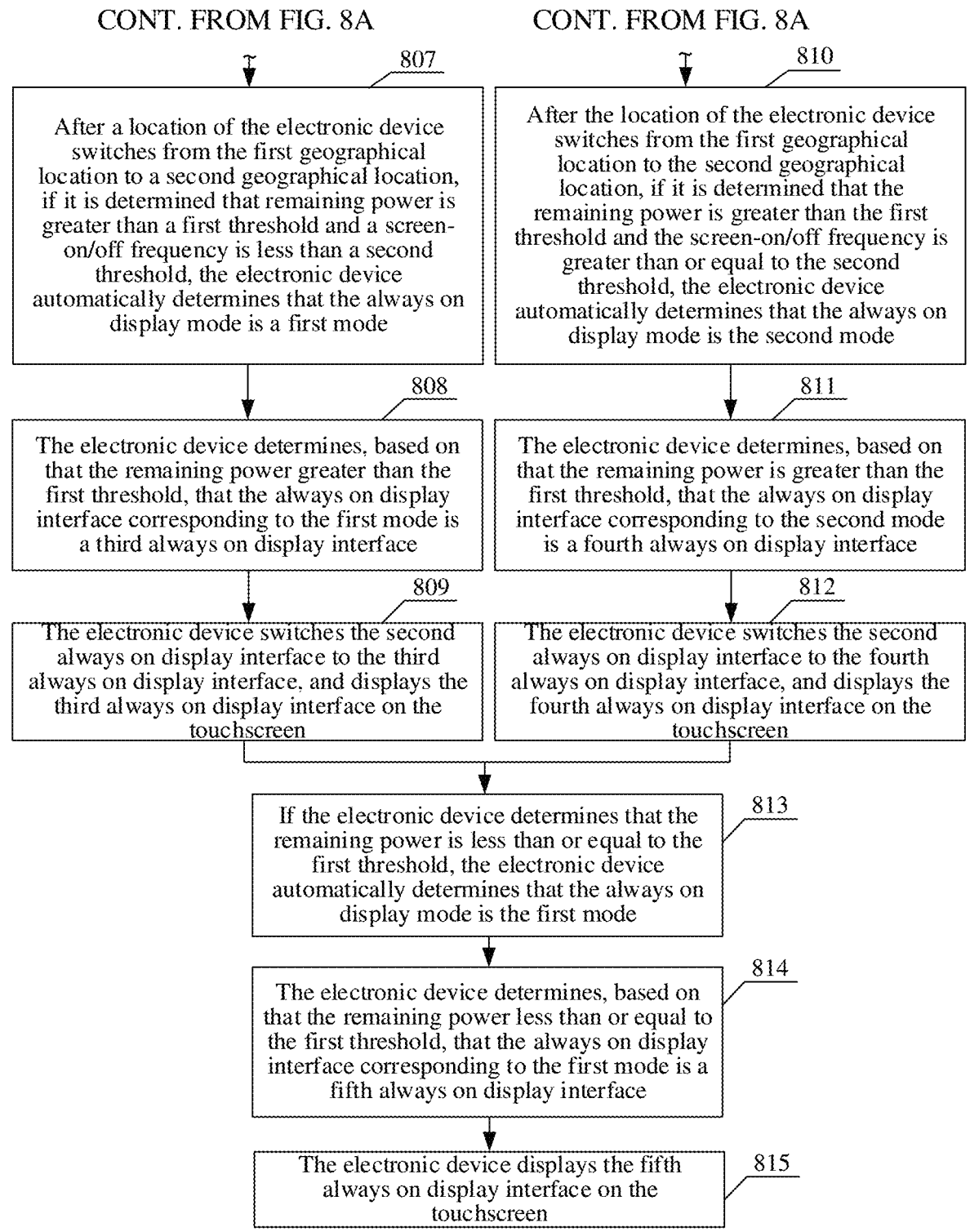

FIG. 8A and FIG. 8B show an always on display method according to an embodiment of this application. The method may be implemented on the electronic device shown in FIG. 2. The method may specifically include:

Step 800: The electronic device receives a screen-off operation.

Step 801: If the electronic device determines that configuration information indicates that an always on display function and intelligent display are enabled, and the electronic device is being charged, the electronic device automatically determines that an always on display mode is a second mode; for example, an always on display interface corresponding to the second mode includes 16.7 mega colors.

Step 802: The electronic device determines, based on the electronic device being charged, that the always on display interface corresponding to the second mode is a first always on display interface; for example, the first always on display interface includes a clock, a date, a missed call, missed SMS message information, remaining power, a background wallpaper, and N application icons; for example, the N application icons are icons of top N applications that are installed on the electronic device and that are most frequently used by a user, and N is a positive integer greater than or equal to 1; and a display effect of the first always on display interface is a display effect selected by the user from a plurality of different display effects of the always on display interface corresponding to the second mode.

Step 803: The electronic device displays the first always on display interface on a touchscreen.

Step 804: After the electronic device detects that charging is completed and the electronic device stops charging, if a first geographical location is located, the electronic device automatically determines that the always on display mode is the second mode.

Step 805: The electronic device determines, based on that the charging is completed and the electronic device stops charging, that the always on display interface corresponding to the second mode is a second always on display interface; for example, the second always on display interface includes the clock, the date, the missed call, the missed SMS message information, the background wallpaper, and M application icons; for example, the M application icons are icons of top M applications that are installed on the electronic device and that are most frequently used by the user, and M is a positive integer less than N and greater than or equal to 1; and a display effect of the second always on display interface is a display effect selected by the user from the plurality of different display effects of the always on display interface corresponding to the second mode.

Step 806: The electronic device switches the first always on display interface to the second always on display interface, and displays the second always on display interface on the touchscreen.

Step 807: After a location of the electronic device switches from the first geographical location to a second geographical location, if it is determined that the remaining power is greater than a first threshold and a screen-on/off frequency is less than a second threshold, the electronic device automatically determines that the always on display mode is a first mode; for example, an always on display interface corresponding to the first mode includes eight colors.

Step 808: The electronic device determines, based on that the remaining power is greater than the first threshold, that the always on display interface corresponding to the first mode is a third always on display interface; for example, the third always on display interface includes the clock, the date, the missed call, a missed SMS message, and the remaining power; for example, a display effect of the third always on display interface is a display effect selected by the user from a plurality of different display effects of the always on display interface corresponding to the first mode.

Step 809: The electronic device switches the second always on display interface to the third always on display interface, and displays the third always on display interface on the touchscreen.

Step 810: After the location of the electronic device switches from the first geographical location to the second geographical location, if it is determined that the remaining power is greater than the first threshold and the screen-on/off frequency is greater than or equal to the second threshold, the electronic device automatically determines that the always on display mode is the second mode.

Step 811: The electronic device determines, based on that the remaining power is greater than the first threshold, that the always on display interface corresponding to the second mode is a fourth always on display interface; for example, the fourth always on display interface includes the clock, the date, the missed call, the missed SMS message, the remaining power, the background wallpaper, and K application icons; the K application icons are icons of top K applications that are installed on the electronic device and that are most frequently used by the user, and K is a positive integer less than M and greater than or equal to 1; and a display effect of the fourth always on display interface is a display effect selected by the user from the plurality of different display effects of the always on display interface corresponding to the second mode.

Step 812: The electronic device switches the second always on display interface to the fourth always on display interface, and displays the fourth always on display interface on the touchscreen.

Step 813: If the electronic device determines that the remaining power is less than or equal to the first threshold, the electronic device automatically determines that the always on display mode is the first mode.

Step 814: The electronic device determines, based on that the remaining power is less than or equal to the first threshold, that the always on display interface corresponding to the first mode is a fifth always on display interface; for example, the fifth always on display interface includes the clock and the date; and a display effect of the fifth always on display interface is a display effect selected by the user from the plurality of different display effects of the always on display interface corresponding to the first mode.

Step 815: The electronic device displays the fifth always on display interface on the touchscreen.

In addition, in some embodiments, a display driver chip in the mobile phone 200 includes a mobile industry processor interface (mobile industry processor interface, MIPI) display serial interface (display serial interface, DSI), a frame memory, a parameter register, and a high dynamic range (high dynamic range, HDR) and optical uniformity compensation (programmable optical compensation, POC) module, a time sequence controller, a data latch, a digital-to-analog converter (digital to analog converter, DAC), and a source driver (source driver).

In this embodiment of this application, to further reduce power consumption of the terminal, after the screen of the mobile phone 200 is turned off, a possible manner of displaying the screen corresponding to the first mode is: When the display driver chip triggers a display apparatus to display the screen, without processing by the HDR and POC module in the display driver chip, the frame memory directly sends data to the time sequence controller. After being processed by the time sequence controller, the data is sent to the source driver through the data latch and the DAC. The source driver controls a display panel to display in the simple mode.

Figure 9:
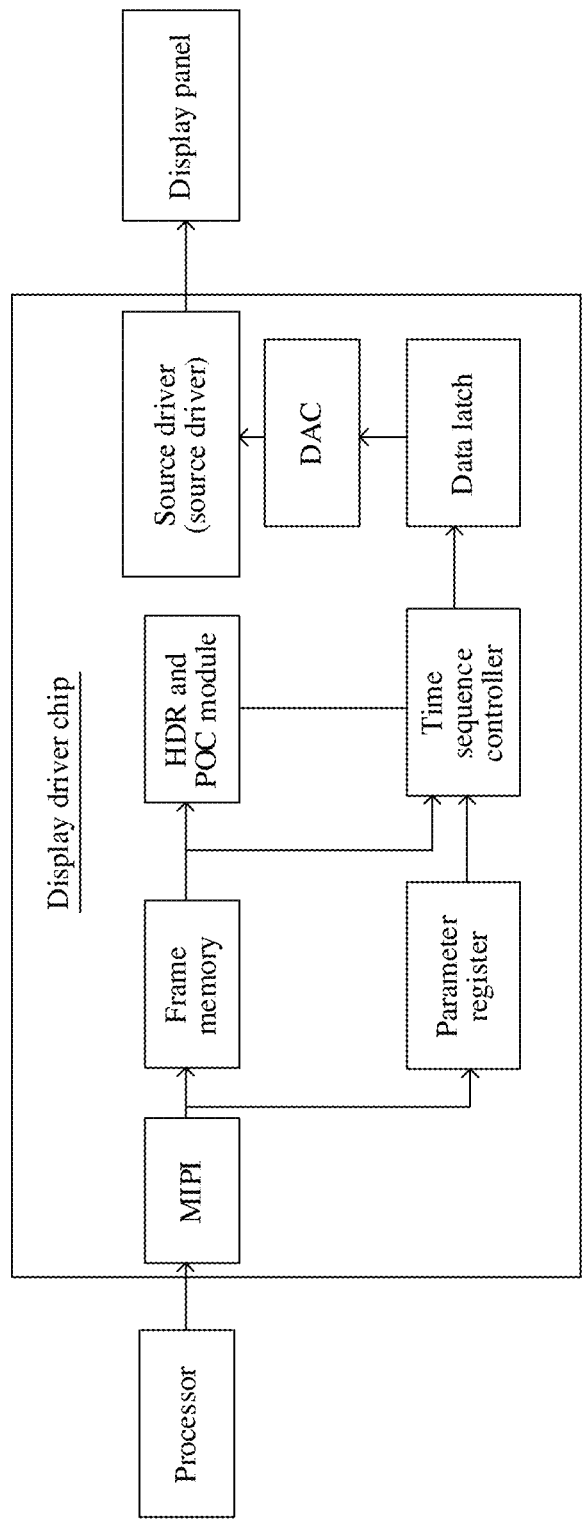
FIG. 9 is a schematic structural diagram of a display driver chip according to this application.

For example, FIG. 9 is a schematic structural diagram of the display driver chip. Specifically, the display driver chip includes a MIPI, a frame memory, a parameter register, an HDR and POC module, a time sequence controller, a data latch, a DAC, and a source driver.

The MIPI is configured to: receive data from a processor; send, to the frame memory, data that is in the data and that needs to be displayed on the display panel; and send, to the parameter register, a configuration parameter (for example, a power sequence for turning on or off the screen, brightness information, or the like) and a control parameter that are in the data and that are of the display panel during display. The control parameter is used to control a connectivity status between the frame memory and the HDR and POC module, and a connectivity status between the frame memory and the time sequence controller. For example, when the control parameter is 1, the frame memory is connected to the HDR and POC module, and disconnected from the time sequence controller. When the control parameter is 0, the frame memory is disconnected from the HDR and POC module, and connected to the time sequence controller. A value of the control parameter is determined by the processor based on an always on display mode intelligently matched by the terminal. If the terminal matches the second mode, the value of the control parameter indicates that the frame memory is connected to the HDR and POC module, and disconnected from the time sequence controller. If the terminal matches the first mode, the value of the control parameter indicates that the frame memory is disconnected from the HDR and POC module, and connected to the time sequence controller.

The frame memory is configured to: after receiving the data from the MIPI, if the frame memory is connected to the HDR and POC module, and disconnected from the time sequence controller, send the data to the HDR and POC module; if the frame memory is disconnected from the HDR and POC module, and connected to the time sequence controller, send the data to the time sequence controller.

The HDR and POC module is configured to receive to-be-displayed data from the frame memory, perform display effect processing such as contrast and uniformity processing on the to-be-displayed data, and send the processed to-be-displayed data to the time sequence controller.

The parameter register is configured to receive the configuration parameter and the control parameter from the MIPI, send the configuration parameter to the time sequence controller, and control, based on the control parameter, the connectivity status between the frame memory and the HDR and POC module, and the connectivity status between the frame memory and the time sequence controller.

The time sequence controller is configured to receive the to-be-displayed data sent by the frame memory or the HDR and POC module, and the configuration parameter from the parameter register, process the to-be-displayed data based on the configuration parameter and a display effect on the display panel, and send the to-be-displayed data to the data latch.

The data latch is configured to receive the data from the time sequence controller, and send the data to the DAC.

The DAC is configured to receive the data from the data latch, convert the data from a digital signal into an analog signal, and send the analog signal to the source driver.

The source driver is configured to receive the analog signal from the DAC, and trigger, based on the analog signal, the display panel to display the to-be-displayed data.

It should be noted that in this embodiment of this application, the parameter register may control the connectivity status between the frame memory and the HDR and POC module by controlling a connectivity status of a switch between the frame register and the HDR and POC module, and control the connectivity status between the frame memory and the time sequence controller by controlling a connectivity status of a switch between the frame register and the time sequence controller. It should be understood that the switch in this embodiment of this application may be a transistor, or may be a switch in another form. This is not limited.

Figure 10:
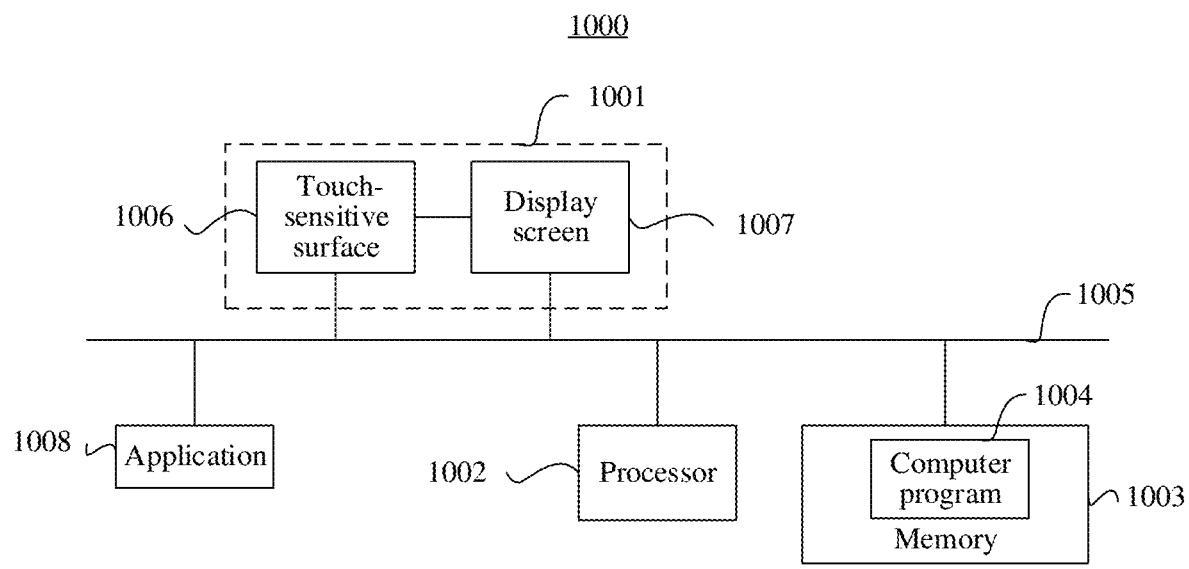
FIG. 10 is a schematic structural diagram of an electronic device according to this application.

As shown in FIG. 10, an embodiment of this application discloses an electronic device 1000. The electronic device 1000 may include a touchscreen 1001, where the touchscreen 1001 includes a touch-sensitive surface 1006 and a display screen 1007; one or more processors 1002; a memory 1003; a plurality of applications 1008; and one or more computer programs 1004. The components may be connected by using one or more communications buses 1005. The one or more computer programs 1004 are stored in the memory 1003 and are configured to be executed by the one or more processors 1002. The one or more computer programs 904 include an instruction, and the instruction may be used to perform the steps in FIG. 6 and the corresponding embodiments.

In the embodiments provided in this application, the methods provided in the embodiments of this application are described from a perspective in which the electronic device is used as an execution body. To implement functions in the methods provided in the embodiments of this application, the electronic device may include a hardware structure and/or a software module, and implement the functions in a form of the hardware structure, the software module, or a combination of the hardware structure and the software module. Whether a function of the functions is performed by using the hardware structure, the software module, or the combination of the hardware structure and the software module depends on a specific application and a design constraint condition of the technical solution.

Figure 11:
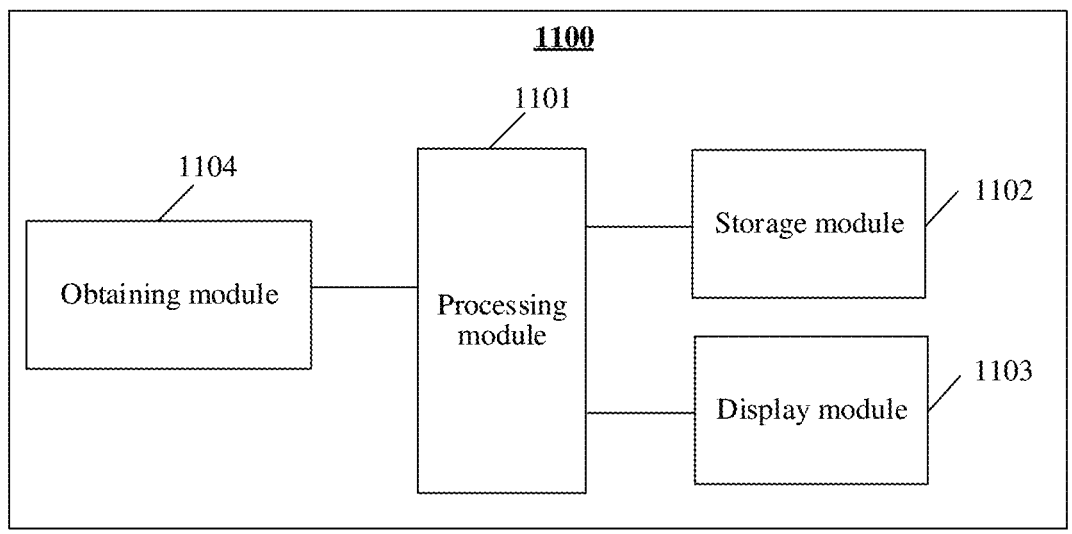
FIG. 11 is a schematic structural diagram of an electronic device according to this application.

Based on a same concept, FIG. 11 shows an electronic device 1100 according to this application. The electronic device 1100 includes an obtaining module 1101, a processing module 1102, a display module 1103 and a storage module 1104. The storage module 1104 stores an always on display mode. The always on display mode includes a first mode and a second mode. An always on display interface corresponding to the first mode is different from an always on display interface corresponding to the second mode. After a screen is turned off, power consumption of the electronic device displaying in the first mode is lower than power consumption of the electronic device displaying in the second mode. The obtaining module 1101 is configured to obtain device status information. The device status information is information related to a current running state of the electronic device. The processing module 1102 is configured to automatically determine, from the first mode and the second mode based on the device status information, an always on display mode corresponding to the device status information. The display module 1103 is configured to display, after the screen is turned off, an always on display interface corresponding to the determined always on display mode.

In some embodiments, the always on display interface corresponding to the first mode and the always on display interface corresponding to the second mode each include a plurality of different display effects.

The processing module 1102 is further configured to determine a display effect of the always on display interface corresponding to the determined always on display mode as a target display effect. The target display effect is a display effect selected by a user from a plurality of different display effects of the always on display interface corresponding to the determined always on display mode.

In some embodiments, the always on display interface corresponding to the first mode does not include a background wallpaper, but includes at least one of a clock, a date, remaining power, a missed call, and unread SMS message information.

In some embodiments, the always on display interface corresponding to the second mode includes at least one of the clock, the date, the remaining power, the missed call, the unread SMS message information, the background wallpaper, and an application icon.

In some embodiments, the processing module 1102 is further configured to determine, based on current remaining power and a preset correspondence between the remaining power and a quantity of application icons, a quantity of application icons on the always on display interface corresponding to the second mode; or determine, based on the current remaining power and a preset correspondence between the remaining power and the application icon, an application icon on the always on display interface corresponding to the second mode.

In some embodiments, the device status information includes remaining battery power information.

Based on the remaining battery power information, the processing module 1102 is configured to determine, if it is determined that remaining battery power is less than or equal to a first threshold, that the always on display mode corresponding to the device status information is the first mode; and determine, if it is determined that the remaining battery power is greater than the first threshold, that the always on display mode corresponding to the device status information is the second mode.

In some embodiments, the device status information includes screen-on/off frequency information.

Based on the screen-on/off frequency information, the processing module 1102 is configured to determine, if it is determined that a screen-on/off frequency is less than or equal to a second threshold, that the always on display mode corresponding to the device status information is the first mode; and determine, if it is determined that the screen-on/off frequency is greater than the second threshold, that the always on display mode corresponding to the device status information is the second mode.

In some embodiments, the device status information includes a bedtime alarm and a wake-up alarm.

The processing module 1102 is configured to determine, when a current moment reaches a moment set for the bedtime alarm, that the always on display mode corresponding to the device status information is the first mode; and determine, when the current moment reaches a moment set for the wake-up alarm, that the always on display mode corresponding to the device status information is the second mode.

In some embodiments, the obtaining module 1101 is specifically configured to obtain the device status information after receiving a screen-off operation on a touchscreen. For example, the obtaining module 1101 is specifically configured to, after receiving the screen-off operation on the touchscreen, obtain the device status information before the display module turns off the screen. Alternatively, the obtaining module 1101 is specifically configured to obtain the device status information after the display module turns off the screen.

In some embodiments, the display module 1103 is further configured to, after displaying the always on display interface corresponding to the determined always on display mode, display a lock screen on the touchscreen in response to a screen-on operation received by the obtaining module.

In some embodiments, the device status information further includes at least one of configuration information, a charging status, a geographical location, a quantity of walking steps, and a heart rate of the user.

In some embodiments, the configuration information includes configuration information indicating whether an always on display function and intelligent display are enabled. The configuration information is obtained by the obtaining module 1101 from an always on display settings interface. The always on display settings interface includes an always on display option, a first mode option, a second mode option, an intelligent mode option, a first virtual button, a second virtual button, a third virtual button, and a fourth virtual button. The first virtual button is used to enable or disable the always on display function. The second virtual button is used to enable or disable the first mode. The third virtual button is used to enable or disable the second mode. The fourth virtual button is used to enable or disable an intelligent mode. The always on display interface corresponding to the second mode includes 16.7 mega colors. The always on display interface corresponding to the first mode includes eight colors. For example, the first mode is a simple mode, and the second mode is a multicolor mode.

In some embodiments, the device status information is periodically obtained by the electronic device.

In some embodiments, the display module 1103 is an OLED screen.

It should be noted that a specific hardware implementation of the obtaining module 1101 may be a sensor or an input device (for example, a touchscreen); a specific hardware implementation of the processing module 1102 may be one or more processors; a specific hardware implementation of the storage module 1104 may be a memory, and a specific hardware implementation of the display mode 1101 may be a touchscreen or the like.

The processor in the embodiments may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, or a discrete hardware component. The processor may implement or perform the methods, steps, and logical block diagrams disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory (random access memory, RAM), a flash memory, a read-only memory (read-only memory, ROM), a programmable read-only memory, an electrically erasable programmable memory, a register, or the like. The storage medium is located in a memory, and the processor reads an instruction in the memory and completes the steps in the foregoing methods in combination with hardware of the processor.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on a particular application and a design constraint condition of the technical solutions. A person skilled in the art may implement the described functions for each specific application by using different methods.

It may be clearly understood by a person skilled in the art that, for convenience and brevity of description, for a specific working process of the foregoing system, apparatus, and units, refer to a corresponding process in the foregoing method embodiments. Details are not described herein again.

In the several embodiments provided in this application, it should be understood that the disclosed system, apparatus, and methods may be implemented in another manner. For example, the described apparatus embodiment is merely an example. For example, division into the unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or all or a part of the technical solutions may be implemented in a form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
   a touchscreen;
   one or more processors; and
   a memory storing instructions which, when executed by the one or more processors, cause the electronic device to:
   obtain first device status information in response to receiving a screen-off operation and while the touchscreen is off, wherein the first device status information is first information related to a first current running state of the electronic device;
   determine a first always on display interface according to the first device status information;
   display the first always on display interface on the touchscreen;
   obtain second device status information while the first always on display interface is displayed, wherein the second device status information is second information related to a second current running state of the electronic device;
   determine a second always on display interface based on the second device status information; and
   display the second always on display interface on the touchscreen.

2. The electronic device of claim 1, wherein power consumption of the first always on display interface is less than power consumption of the second always on display interface.

3. The electronic device of claim 1, wherein the first always on display interface comprises a time, a date, and remaining power.

4. The electronic device of claim 1, wherein the first device status information is a first time, and the second device status information is a second time.

5. The electronic device of claim 1, wherein the first always on display interface includes 8 colors, and the second always on display interface includes about 16.7 million colors.

6. The electronic device of claim 1, wherein the instructions include instructions which, when executed by the one or more processors, further cause the electronic device to:
   receive a screen-on operation; and
   display a lock screen in response to the screen-on operation.

7. The electronic device of claim 1, wherein the instructions include instructions which, when executed by the one or more processors, further cause the electronic device to:
   receive the screen-off operation; and
   turn off the touchscreen in response to the screen-off operation.

8. The electronic device of claim 1, wherein the first always on display interface corresponds to a first mode, and wherein the second always on display interface corresponds to a second mode.

9. An electronic device, comprising:
   a touchscreen;
   one or more processors; and
   a memory for storing instructions which, when executed by the one or more processors, cause the electronic device to:
   receive a screen-off operation;
   turn off the touchscreen in response to the screen-off operation;
   obtain first device status information in response to receiving the screen-off operation and while the touchscreen is off, wherein the first device status information is first information related to a first current running state of the electronic device
   display a first always on display interface;
   obtain, while the first always on display interface is displayed, second device status information, wherein the second device status information is second information related to a second current running state of the electronic device;
   determine a second always on display interface based on the second device status information; and
   display the second always on display interface on the touchscreen;

wherein power consumption of the first always on display interface is less than power consumption of the second always on display interface.

10. An electronic device, comprising:
a touchscreen;
one or more processors; and
a non-transitory memory storing a program to be executed by the one or more processors, the program including instructions to:
display a home screen on the touchscreen;
detect a first operation;
display a first always on display (AOD) interface in response to the first operation being a screen off operation at a first time, and while the touchscreen is off;
display a second AOD interface at a second time after the first time, and in response to the first AOD interface being displayed, wherein power consumption of the first AOD interface is lower than power consumption of the second AOD interface;
detect a screen-on operation;
display, in response to the screen-on operation, a lock screen on the touchscreen without displaying the second AOD interface after detecting the screen-on operation;
display the home screen in response to an unlock operation through the lock screen.

11. The electronic device of claim 10, wherein the first AOD interface comprises the first time, a date, and remaining power.

12. The electronic device of claim 10, wherein the second AOD interface comprises the second time, a date, and remaining power.

13. The electronic device of claim 10, wherein the first AOD interface includes 8 colors, and wherein the second AOD interface includes 16.7 million colors.

14. The electronic device of claim 10, wherein the program includes instructions to turn on a portion of the touchscreen to display information.

15. The electronic device of claim 10, wherein the electronic device is a smartwatch.

* * * * *